United States Patent
Cho et al.

(10) Patent No.: US 7,499,424 B2
(45) Date of Patent: Mar. 3, 2009

(54) METHOD AND APPARATUS FOR TRANSMITTING/RECEIVING TRANSMISSION STATUS INFORMATION AND BUFFER STATE INFORMATION IN A MOBILE COMMUNICATION SYSTEM THAT SUPPORTS UPLINK PACKET SERVICE

(75) Inventors: Joon-Young Cho, Suwon-si (KR); Ju-Ho Lee, Suwon-si (KR); Young-Bum Kim, Seoul (KR); Youn-Hyoung Heo, Suwon-si (KR); Yong-Jun Kwak, Yongin-si (KR); Gert Jan Van Lieshout, Middlesex (GB); Sung-Oh Hwang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 680 days.

(21) Appl. No.: 11/121,176

(22) Filed: May 4, 2005

(65) Prior Publication Data

US 2005/0271031 A1 Dec. 8, 2005

(30) Foreign Application Priority Data

| May 6, 2004 | (KR) | ................ 10-2004-0032015 |
| Jun. 14, 2004 | (KR) | ................ 10-2004-0043762 |
| Oct. 14, 2004 | (KR) | ................ 10-2004-0082072 |
| Oct. 15, 2004 | (KR) | ................ 10-2004-0082615 |

(51) Int. Cl.
*H04Q 7/00* (2006.01)
(52) U.S. Cl. .................................. 370/328
(58) Field of Classification Search ........... 370/310, 370/328, 329, 342, 431, 437, 441, 463; 709/227–230
See application file for complete search history.

(56) References Cited

U.S. PATENT DOCUMENTS

| 7,167,487 B2 * | 1/2007 | Herrmann ................ 370/477 |
| 7,301,988 B2 * | 11/2007 | Kanterakis ................ 375/141 |
| 7,333,457 B2 * | 2/2008 | Gopalakrishnan et al. ... 370/335 |
| 2004/0085936 A1 | 5/2004 | Gopalakrishnan ........... 370/335 |
| 2005/0220040 A1 * | 10/2005 | Petrovic et al. ............. 370/278 |

FOREIGN PATENT DOCUMENTS

WO 2004/034656 4/2004

OTHER PUBLICATIONS $3^{RD}$ Generation Partnership Project; Technical Specification Group Radio Access Network; Feasibility Study for Enhanced Uplink for UTRA FDD (3GPP TR 25.896 V6.0.0) [online] Mar. 2004, pp. 21-24.

* cited by examiner

*Primary Examiner*—Dmitry Levitan
(74) *Attorney, Agent, or Firm*—Roylance, Abrams, Berdo & Goodman, LLP

(57) ABSTRACT

Disclosed is a method and apparatus for efficiently transmitting/receiving transmission power status information (TPS) and buffer state information (BO) of a user equipment (UE). Under the assumption that an enhanced uplink dedicated transport channel (EUDCH) is used for an uplink data transmission in an asynchronous code division multiple access (CDMA) system, a scheduler of a Node B performs a scheduling operation such as transmission timing of EUDCH packet data, data rate assignment, and the like. The scheduler receives the EUDCH packet data BO, TPS, and the like, and efficiently performs processes of start/continuation/end of the TPS transmission.

42 Claims, 15 Drawing Sheets

METHOD AND APPARATUS FOR TRANSMITTING/RECEIVING TRANSMISSION STATUS INFORMATION AND BUFFER STATE INFORMATION IN A MOBILE COMMUNICATION SYSTEM THAT SUPPORTS UPLINK PACKET SERVICE

PRIORITY

This application claims the benefit under 35 U.S.C. 119(a) of applications entitled "Method and Apparatus for Transmitting/Receiving Transmission Status Information and Buffer State Information in Mobile Communication System That Supports Uplink Packet Service" filed in the Korean Industrial Property Office on May 6, 2004 and assigned Serial No. 2004-32015, Jun. 14, 2004 and assigned Serial No. 2004-43762, Oct. 14, 2004 and assigned Serial No. 2004-82072, and Oct. 15, 2004 and assigned Serial No. 2004-82615, respectively, the entire contents of which are hereby incorporated by reference.

BACKGROUND OF THE INVENTION

1. Field of the Invention

The present invention relates generally to a mobile communication system that supports an uplink packet transmission service. More particularly, the present invention relates to a method and apparatus for efficiently transmitting/receiving transmission power information and buffer state information of a user equipment.

2. Description of the Related Art

Mobile communication systems have evolved into a high-speed and high-quality $3^{rd}$ generation mobile communication system for providing a data service and multimedia service in addition to a voice-oriented service. The $3^{rd}$ generation mobile communication system is a mobile communication system that supports not only a voice service but also a packet service, and adopts a code division multiple access (CDMA) system. The $3^{rd}$ generation mobile communication system may be classified into a $3^{rd}$ Generation Project Partnership (3GPP), or Universal Mobile Telecommunication System (UMTS) that is the European and Japanese standard system based on asynchronous communication among base stations (hereinafter referred to as "Nodes B") and a $3^{rd}$ Generation Project Partnership 2 (3GPP2), or CDMA2000 that is the U.S. standard system based on synchronous communication among Nodes B.

Presently, in the $3^{rd}$ generation mobile communication system that is divided into the asynchronous type (3GPP) and the synchronous type (3GPP2), standardization for a high-speed and high-quality wireless data packet service is in progress. For example, in 3GPP, standardization for a high-speed downlink packet access (HSDPA) is in progress, and in 3GPP2, a standardization work for First Evolution Data and Voice (1xEV-DV) is in progress. Such standardization results from the efforts made to find a solution for the wireless data packet transmission service of a high-speed of more than 2 Mbps and a high quality.

In 3GPP, an Enhanced Uplink Dedicated Channel (EUDCH) system has additionally been proposed as a scheme for achieving a high-speed packet transmission from a required (i.e., a Node B) to a user equipment (UE) and a high-speed packet transmission from a UE to a Node B as well.

The EUDCH system has been proposed for the purpose of further heightening the performance of the packet transmission through the introduction of a new technology in an uplink communication in an asynchronous CDMA communication system. The EUDCH system adopts an Adaptive Modulation and Coding (AMC) technique and a Hybrid Automatic Repeat Request (HARQ) technique, which have been used as the existing HSDPA technology. Accordingly, the Node B should transmit an acknowledge (ACK) or negative acknowledge (NACK) signal to the UE according to the success/failure of decoding of the received data.

However, in order to support the EUDCH, a short frame of a Transmission Time Interval (TTI) that is shorter than the TTI used in the HSDPA system to transmit packet data at high speed by rapidly indicating the state of an uplink channel. That is the EUDCH system and the HSDPA system differ from each other in terms of performing the AMC technique and the HARQ technique. The TTI can be defined in the unit of a data block in a physical channel.

Accordingly, for the EUDCH system, an uplink channel scheduling for assigning proper resources by cells should be performed together with the AMC technique, the HARQ technique and the short TTI as described above. The required uplink channel scheduling is to efficiently use the limited wireless resources.

Typically, the data rate for the uplink channel is determined by the UE within an upper threshold value of a predetermined possible data rate. The upper threshold value is provided to the UE by a radio network controller (RNC). That is, the data rate of the existing uplink channel has not been adjusted by the Node B. However, in the EUDCH, whether to transmit the uplink data, the upper threshold value of the usable data rate, etc., are determined by the Node B. Additionally, the determined information is transmitted to the UE as a scheduling command. The UE determines the data rate to be used in the EUDCH according to the scheduling command.

FIG. 1 is a diagram illustrating an example of a conventional mobile communication network in which a Node B and a plurality of UEs that perform an uplink transmission with the Node B exist.

Referring to FIG. 1, the UEs 110, 112, 114 and 116 are transmitting packet data with different transmission powers 120, 122, 124 and 126, respectively, according to the distances between the UEs and the Node B 100. The UE 110 that is farthest apart from the Node B transmits the packet data with the highest transmission power 120. The UE 114 that is nearest to the Node B 100 transmits the packet data with the lowest transmission power 124. According to a scheduling algorithm applied to the Node B 100, the transmission powers and packet data rates applied to the UEs 110, 112, 114 and 116 may be different from one another.

FIG. 2 is a view illustrating a conventional signaling procedure performed between a UE and a Node B for supporting an uplink packet service.

Referring to FIG. 2, the EUDCH is set between the Node B 200 and the UE 202 at step 204. That is, the step 204 comprises a process of transmitting/receiving messages through a dedicated transport channel. Then, the UE 202 transmits data rate information, uplink channel state information, and the like to the Node B 200. The uplink channel state information comprises an uplink channel transmission power transmitted by the UE 202, a transmission power margin of the UE 202, and the like.

The Node B 200 that has received the uplink channel transmission power can estimate the uplink channel state by comparing the uplink channel transmission power and a reception power. That is, if a difference between the uplink channel transmission power and the uplink channel reception power is small, it is determined that the uplink channel state is good, while if the difference is large, it is determined that the uplink channel state is poor. In the case in which the UE 202 transmits the transmission power margin in order to estimate the uplink channel state, the Node B 200 can estimate the uplink transmission power by subtracting the transmission power margin from the possible maximum transmission power of the UE already known. The Node B 200 determines the possible maximum transmission power using the estimated channel state of the UE, the transmission power margin and the data rate information required by the UE 202.

The maximum data rate as determined above is reported to the UE 202 at step 208. The UE 202 determines the data rate of the packet data to be transmitted within the range of the reported maximum data rate. Then, the Node B 200 transmits the packet data by the determined data rate at step 210.

If the decoding of the packet data succeeds without error, the Node B 200 transmits an acknowledge (ACK) signal to the corresponding UE 202 at step 212. When the ACK signal is received, the UE 202 transmits new packet data to the Node B 200. However, if the decoding of the packet data fails, the Node B 200 transmits a negative acknowledge (NACK) signal to the UE at step 212. If the NACK signal is received, the UE 202 retransmits the packet data previously transmitted at step 210.

The uplink physical channel for the EUDCH service as described above comprises a dedicated physical data channel (DPDCH), a dedicated physical control channel (DPCCH), a high-speed dedicated physical control channel (HS-DPCCH) for the HSDPA service, a dedicated physical data channel (EU-DPDCH) for the EUDCH service, a dedicated physical control channel (EU-DPCCH), etc.

Specifically, through the EU-DPCCH, a transport format and resource indicator (E-TFRI) of the packet data transmitted to the EU-DPDCH is transmitted. Additionally, through the EU-DPCCH, transmission status information according to the packet data transmission of the UE is transmitted to the Node B. The transmission status information comprises a buffer occupancy information (BO), transmission power status information (TPS), etc.

Through the EU-DPDCH, the packet data is transmitted using the data rate determined by the scheduling information. The DPDCH supports only a Binary Phase Shift Key (BPSK) modulation system. However, in order to heighten the data rate as maintaining the number of spreading codes simultaneously transmitted, the EU-DPDCH can support Quaternary Phase Shift Keying (QPSK), 8 Phase Shift Keying (PSK), etc., in addition to the BPSK.

As described above, the Node B receives information such as BO, TPS, etc., from the UE in order to perform the scheduling operation such as the transmission timing of the EUDCH packet data, the data rate assignment, etc. In this case, it is conventional that the BO among the above-described information is reported to the Node B only in the case in which new data is produced in an EUDCH packet data buffer of the UE. By contrast, the TPS is periodically reported irrespective of the production of the new data.

Accordingly, even in the case in which the packet data to be transmitted does not exist in the EUDCH packet data buffer, the UE continuously reports the TPS, and this causes an uplink interference level to be increased. Additionally, due to the demodulation/decoding of the TPS that is periodically transmitted from the transmitter of the UE and the receiver of the Node B, unnecessary power is consumed.

SUMMARY OF THE INVENTION

Accordingly, the present invention has been designed to solve the above and other problems occurring in the prior art, and an object of the present invention is to provide a method and apparatus for efficiently transmitting/receiving buffer state and transmission power status information in a mobile communication system that supports an uplink packet service.

Another object of the present invention is to provide a method and apparatus that can secure a stable transmission/reception between a user equipment (UE) and a Node B in transmitting buffer state and transmission power status information in a mobile communication system that supports an uplink packet service.

Still another object of the present invention is to provide a method and apparatus that can reduce a signaling overhead in transmitting buffer state and transmission power status information in a mobile communication system that supports an uplink packet service.

In order to accomplish the above and other objects, there is provided a method of efficiently providing transmission power status information (TPS) and buffer occupancy information (BO), which is performed by a user equipment (UE), in a mobile communication system, according to the present invention. The method comprises the steps of confirming whether an amount of data to be transmitted by the UE exceeds a preset threshold value, if the amount of data exceeds the threshold value, including the TPS and the BO of the UE in a protocol data unit (PDU) of a media access control layer (MAC-e), and reporting a start of a packet data service by transmitting the MAC-e PDU that comprises the TPS and the BO of the UE to a Node B through a MAC-e signaling.

In another aspect of the present invention, there is provided a method of efficiently providing transmission power status information (TPS) and buffer occupancy information (BO), which is performed by a user equipment (UE), in a mobile communication system. The method comprises the steps of reporting a start of a packet data service by including only the BO of the UE in a protocol data unit (PDU) of a media access control layer (MAC-e) and transmitting the MAC-e PDU to a Node B through a MAC-e signaling if an amount of new data to be transmitted by the UE exceeds a preset threshold value, and reporting continuation of the packet data service by periodically transmitting the TPS information of the UE to the Node B through a dedicated physical control channel (DPCCH) after reporting the start of the packet data service.

In still another aspect of the present invention, there is provided a method of efficiently providing transmission power status information (TPS) and buffer occupancy information (BO), which is performed by a user equipment (UE), in a mobile communication system. The method comprises the steps of periodically transmitting the TPS information of the UE to a Node B through a dedicated physical control channel (DPCCH) during a packet data service, including the BO of the UE in a protocol data unit (PDU) of a media access control layer (MAC-e) and transmitting the MAC-e PDU to the Node B through a MAC-e signaling if new data is produced in a buffer of the UE and an amount of data to be transmitted by the UE exceeds a preset threshold value, and reporting an indicator that indicates an end of TPS transmission of the UE to the Node B through the MAC-e signaling if the amount of data to be transmitted is smaller than the preset threshold value.

In still another aspect of the present invention, there is provided an apparatus for efficiently providing transmission power status information (TPS) and buffer occupancy information (BO) through a user equipment (UE) in a mobile communication system. The apparatus comprises a TPS measurer for measuring the TPS of the UE, a data buffer for storing packet data to be transmitted by the UE and generating the BO that is indicated as an amount of the packet data, a packet data generator for generating a protocol data unit (PDU) of a media access control layer (MAC-e) that comprises the packet data or input information, a packet transmitter for transmitting the generated MAC-e PDU to a Node B through a dedicated physical data channel (DPDCH), a dedicated control channel transmitter for transmitting control information input for the MAC-e PDU, a BO transmission controller for operating to transmit the BO of the data buffer to the packet data generator if an amount of data to be transmitted by the UE exceeds a preset threshold value in an initial state or a continued state of a packet data service, and a TPS transmission controller for inputting the TPS of the initial state from the TPS measurer to the packet data generator, wherein the packet data generator generates the MAC-e PDU that comprises the BO and the TPS of the UE in the initial state.

In still another aspect of the present invention, there is provided an apparatus for efficiently providing transmission power status information (TPS) and buffer occupancy information (BO) through a user equipment (UE) in a mobile communication system. The apparatus comprises a TPS measurer for measuring the TPS of the UE, a data buffer for storing packet data to be transmitted by the UE and generating the BO that is indicated as an amount of the packet data, a packet data generator for generating a protocol data unit (PDU) of a media access control layer (MAC-e) that comprises the packet data or input information, a packet transmitter for transmitting the generated MAC-e PDU to a Node B through a dedicated physical data channel (DPDCH), a dedicated control channel transmitter for transmitting control information input for the MAC-e PDU, a BO transmission controller for transmitting the BO of the data buffer to the packet data generator if an amount of data to be transmitted by the UE exceeds a preset threshold value in an initial state or a continued state of a packet data service, and a TPS transmission controller for periodically transmitting the TPS measured by the TPS measurer to the dedicated control channel transmitter.

In still another aspect of the present invention, there is provided an apparatus for efficiently providing transmission power status information (TPS) and buffer occupancy information (BO) through a user equipment (UE) in a mobile communication system. The apparatus comprises a dedicated physical data channel (DPDCH) receiver for receiving a protocol data unit (PDU) of a media access control layer (MAC-e) from the UE, a dedicated physical control channel receiver for receiving control information from the UE, a TPS report end indicator detector for detecting an indicator that indicates an end of TPS transmission of the UE from the received control information or the MAC-e PDU, a TPS detector for detecting the TPS of the UE from the received MAC-e PDU, a BO detector for detecting the BO of the UE from the received MAC-e PDU, a buffer state estimator for estimating an amount of data in a buffer of the UE by the detected BO and an amount of packet data received from the UE, and a TPS reception controller for detecting the TPS of the UE from the received MAC-e PDU in an initial state of a packet data service and operating to detect the TPS periodically received from the control information during the packet data service.

BRIEF DESCRIPTION OF THE DRAWINGS

The above and other objects, features and advantages of the present invention will be more apparent from the following detailed description taken in conjunction with the accompanying drawings, in which.

Throughout the drawings, the same element is designated by the same reference numeral or character.

DETAILED DESCRIPTION OF EXEMPLARY EMBODIMENTS

Embodiments of the present invention will be described in detail hereinafter with reference to the accompanying drawings. In the following description of the present invention, a detailed description of known functions and configurations incorporated herein will be omitted when it may obscure the subject matter of the present invention.

Figure 1:
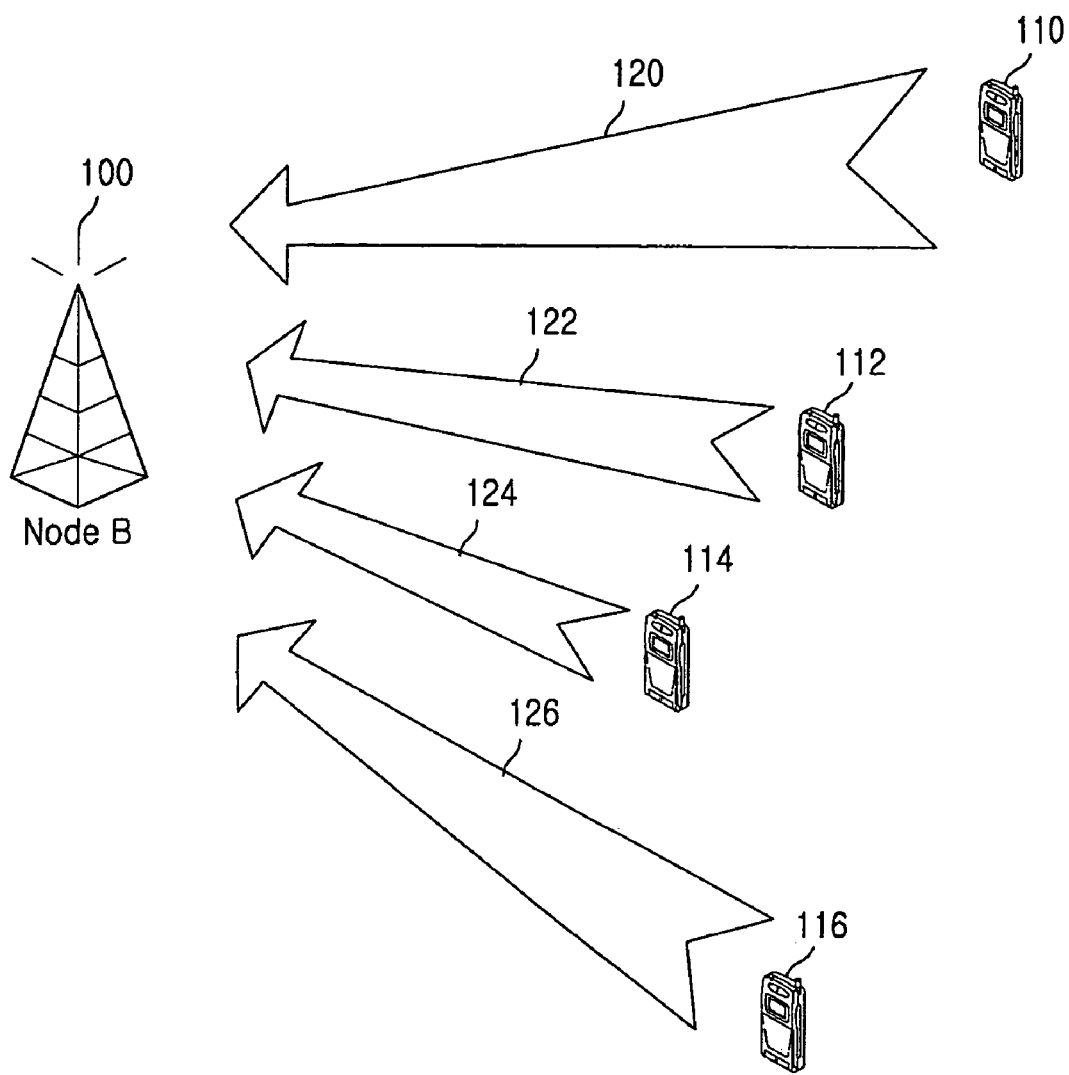
FIG. 1 is a diagram illustrating an example of a conventional mobile communication network that supports an uplink packet service.
Figure 2:
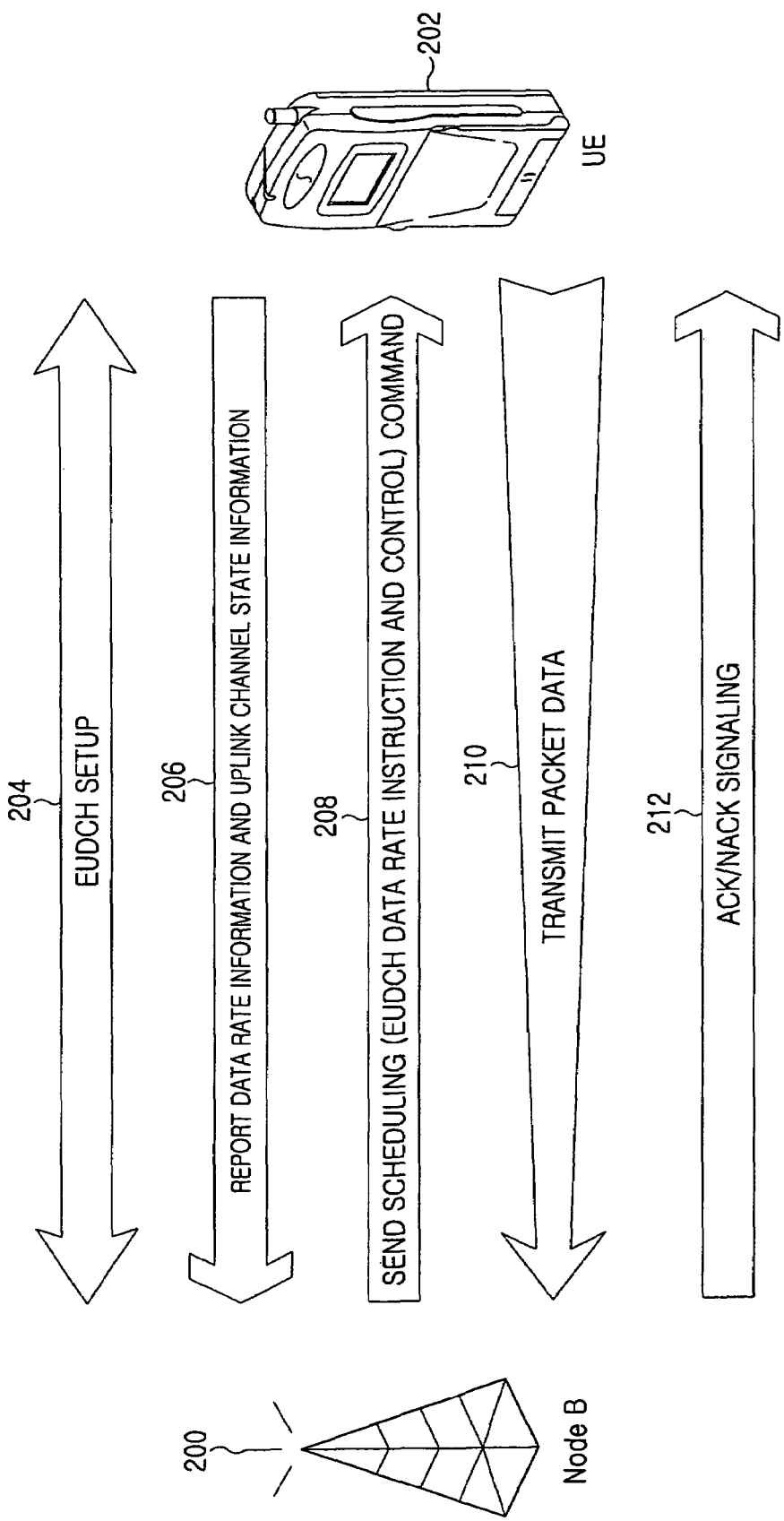
FIG. 2 is a diagram illustrating a conventional signaling procedure performed between a user equipment (UE) and a Node B for supporting an uplink packet service.
Figure 3:
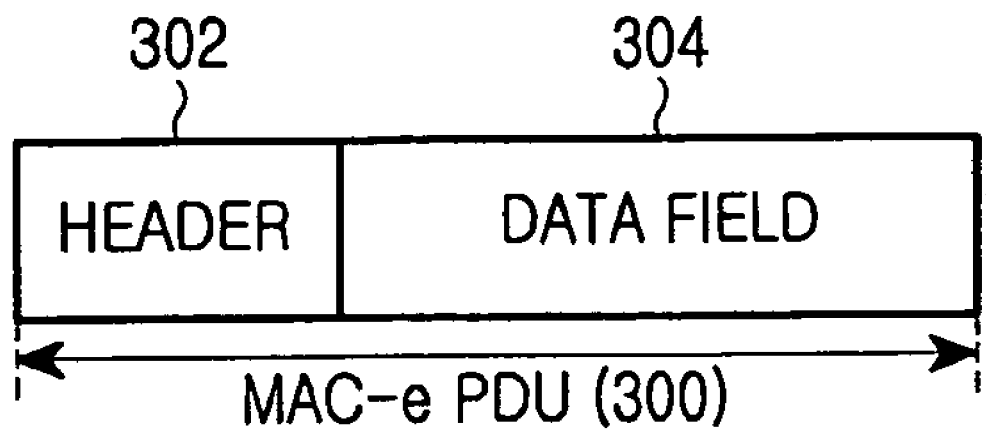
FIG. 3 is a conceptual view illustrating the structure of a media access control layer (MAC-e) protocol data unit (PDU) for supporting an uplink packet service according to an embodiment of the present invention.

For explanation of the concept of a media access control layer (MAC-e) control signaling provided according to embodiments of the present invention, the structure of a MAC-e protocol data unit (PDU) that is transferred from a MAC layer to a physical layer is illustrated in FIG. 3.

Referring to FIG. 3, a data field 304 of a MAC-e PDU 300 carries Enhanced Uplink Dedicated Channel (EUDCH) packet data, and a header field 302 carries Hybrid Automatic Repeat Request (HARQ)-related information and data extraction information of the EUDCH data included in the data field 304. In this embodiment of the present invention, the header field 302 or the data field 304 carries BO and transmission power status (TPS) information of a user equipment (UE). That is, the buffer occupancy information (BO) of which a non-periodic report is required can be transmitted through a MAC-e control signaling for transferring a control information message using the EUDCH packet as described above. The MAC-e PDU 300 is provided to the physical layer that performs a channel coding, a physical channel mapping, etc., of the MAC-e PDU, and then transmitted to a Node B.

Figure 4:
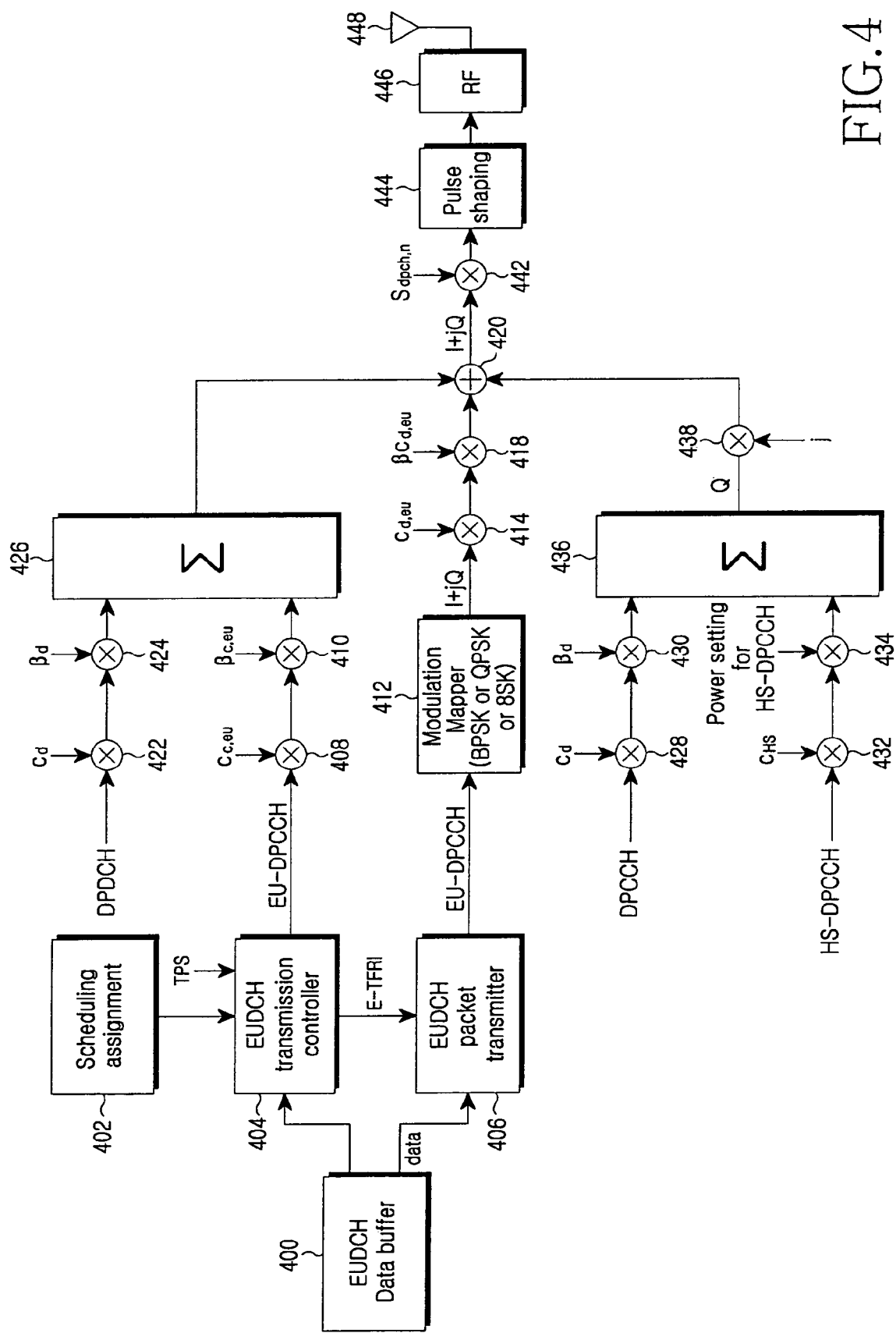
FIG. 4 is a diagram illustrating the construction of a transmitter of a UE for supporting an uplink packet service according to an embodiment of the present invention.

FIG. 4 is a view illustrating the construction of a transmitter of a UE for supporting an uplink packet service according to an embodiment of the present invention.

Referring to FIG. 4, an EUDCH transmission controller 404 generates the EU-Dedicated Physical Control Channel (DPCCH) for transmitting the BO and TPS required for the Node B control scheduling to the Node B. Additionally, the EUDCH transmission controller 404 determines and outputs the E-TFRI so that the determined E-TFRI is transmitted to the Node B through the EU-DUCCH. In this case, the packet data transmission format is determined by a scheduling assignment unit 402 using the allowable maximum data rate.

An EUDCH packet transmitter 406 receives the packet data the amount of which is designated by the transmission format of the transferred EUDCH packet data from an EUDCH data buffer 400. The transferred packet data is channel-coded and modulated using the EUDCH packet data transmission format, and then transmitted to the Node B through the EU-DPDCH.

Meanwhile, the DPDCH data is spread by the chip rate using an orthogonal variable spreading factor (OVSF) code through a multiplier 422, and then multiplied by a channel gain through a multiplier 424. The DPDCH data multiplied by the channel gain is input to an adder 426. Control information of the EU-DPCCH is spread by the chip rate using the OVSF code through a multiplier 408, and then multiplied by the channel gain through a multiplier 410. The control information of the EU-DPCCH multiplied by the channel gain is input to the adder 426. The adder 426 adds the DPDCH data and the control information of the EU-DPCCH to form an I channel.

Now, it is assumed that transmission symbols of the EU-DPDCH are transmitted as complex symbols. That is, in the case of modulating the transmission symbols of the EU-DPDCH using the BPSK, they have real-number values, but in the case of modulating the transmission symbols of the EU-DPDCH using the QPSK, 8PSK, etc., they have complex values. A modulator 412 converts the packet data transferred from the EUDCH packet transmitter 406 into complex symbols of i+jQ, and transfers the complex symbols to a multiplier 414. The multiplier 414 spreads the modulated symbols by the chip rate using the OVSF code. An output of the multiplier 414 is multiplied by the channel gain through a multiplier 418.

The DPCCH control information is spread by the chip rate using the OVSF code through a multiplier 428, and then multiplied by the channel gain through a multiplier 430. The control information multiplied by the channel gain is input to an adder 436. Control information of the HS-DPCCH is spread by the chip rate using the OVSF code through a multiplier 432, and then multiplied by the channel gain through a multiplier 434. The control information multiplied by the channel gain is input to the adder 436. The adder 436 adds the DPCCH control information and the control information of the HS-DPCCH to form a Q channel. An output of the adder 436 is multiplied by an imaginary number through a multiplier 438, and then transferred to an adder 420.

The adder 420 receives and adds an output of the adder 426, an output of the multiplier 418 and an output of the multiplier 438 to for complex symbols. The complex symbols are transferred to a multiplier 442. This multiplier 442 scrambles the complex symbols using a scrambling code. The scrambled complex symbols are converted into a pulse form via pulse shaper 444, processed through a radio frequency (RF) unit 446, and then transferred to the Node B through an antenna 448.

In the following description of the present invention, a scheme for reporting the transmission power status information through the UE only in the case in which data exists in the EUDCH packet data buffer will be explained in detail. For this, the start of the transmission power status report according to the buffer state, continuation of the transmission power status report and end of the transmission power status report should efficiently be performed. For the efficient performing of the start/continuation/end of the TPS report, the present invention provides the following methods by stages.

Hereinafter, the process of performing the start/continuation/end of the transmission power status information according to the embodiments of the present invention will be explained in detail with reference to accompanying drawings.

1. Start

The two following schemes comprise a method of staring the transmission power status report according to the embodiment of the present invention.

Method 1: Scheme for Simultaneous Transmission of BO and TPS Using MAC-e Signaling If the amount of data in the EUDCH packet data buffer exceeds a threshold value for the scheduling, the UE comprises the BO and TPS in the same MAC-e PDU, and transmits the MAC-e PDU to the Node B. Thereafter, the UE periodically transmits the TPS through the physical layer signaling.

Method 2: Scheme for Transmission of BO Only Using MAC-e Signaling

If the amount of data in the EUDCH packet data buffer exceeds the threshold value for the scheduling, the UE transmits only the BO to the Node B using the MAC-e signaling. The TPS is periodically transmitted to the Node B through the physical layer signaling after the report of the BO.

2. Continuation

Hereinafter, the proceeding state of the packet data service will be described as a continued state.

According to the scheme for the continuous report of the transmission power state according to the embodiment of the present invention, the UE periodically reports the TPS to the Node B through the physical layer signaling. When new data is produced in the buffer, the BO information is reported to the Node B through the MAC-e signaling after passing through a threshold value test. The BO information may be the total amount of data in the buffer that presently stores the EUDCH packet, or may be the amount of the newly produced data after the previous report of the BO information.

3. End

The three following schemes comprise a method of ending the transmission power status report according to the embodiment of the present invention.

Method 1: Scheme for UE's Report TPS to Node B

If the amount of data in the EUDCH packet data buffer is reduced below the threshold value for the scheduling, the UE informs the Node B that the TPS transmission will end (if the threshold value is '0', it indicates that data does not exist in the buffer any more).

Method 2: Scheme for Implicit Indication

If the amount of data in the EUDCH packet data buffer of the UE is reduced below the threshold value for the scheduling based on the BO report of the UE and the amount of the received EUDCH data packet, the Node B does not perform the TPS reception any longer.

Method 3: Scheme for Node B's Indication to UE

The Node B, based on the UE's report of the BO and the amount of the received data packet, instructs the UE to measure the amount of data existing in the EUCDH packet data buffer and to end the TPS transmission if the measured amount is reduced below the threshold value.

Meanwhile, the UE may transmit an E-DCH Transport Format Indicator (E-TFI) value corresponding to the maximum transmittable data rate or the corresponding scheduling information instead of the TPS information based on the buffer state and the transmission power margin of the UE, an applicable format of the E-DCH transmission channel, etc., in the above-described processes. Accordingly, if the Node B receives the E-TFI information, it can directly realize the maximum data rate applicable at the scheduling time point. Accordingly, the Node B can transmit a scheduling command based on the data rate to the UE.

Additionally, when the UE reports the transmittable power status, it can estimate and report the remaining power of the whole transmittable maximum power except for the DPCCH subject to scheduling as a transmittable power level of the E-DCH. However, if other channels exist, channels to be reported between the UE and the Node B are prescribed in the same manner as follows in order to achieve an efficient scheduling.

First, if a scheduler schedules a transmission rate of 'DCH+E-DCH' if the DCH of the UE is set, it makes a Node-B scheduler operate efficiently to estimate and report the used power of the DCH. Accordingly, it may be prescribed that the UE reports the transmittable power of 'DCH+E-DCH'. Additionally, in the system that performs an E-DCH-dedicated scheduling, the UE may estimate the transmission power of the DCH and reserve the transmission power of the DCH from the maximum transmission power to report the transmission power of the DCH.

Since the E-DPCCH is a channel that is always transmitted when the E-DCH is transmitted, it is efficient for the UE to report the required power of the E-DCH to the scheduler. Accordingly, it may be prescribed that the UE reserves the power required for the E-DPCCH from the whole maximum transmittable power level in the similar manner to the DCH and report the remaining power as the transmittable power for E-DCH or DCH+E-DCH, or the UE reports the transmittable power of 'E-DCH+E-DPCCH' or 'E-DCH+DCH+E-DPCCH' by adding the power level of E-DPCCH to the remaining power.

Hereinafter, the detailed operations of the embodiments of the present invention will be explained. In the embodiments of the present invention, the TPS report start/continuation/end methods as described above are properly combined. Accordingly, it will be apparent that other combinations can be used by those skilled in the art without departing from the scope of the present invention. In the following embodiments of the present invention, the E-TFI value or the corresponding scheduling information may be transmitted instead of the TPS.

First Embodiment

In the first embodiment of the present invention, a scheme for simultaneous transmission of the BO and TPS using the MAC-e signaling and a scheme for end report by the UE will be explained in detail. Specifically, the report of the transmission power state starts through the scheme for simultaneous transmission of the BO and TPS using the MAC-e signaling, and then the report of the transmission power state ends through the scheme for end report by the UE.

Figure 5:
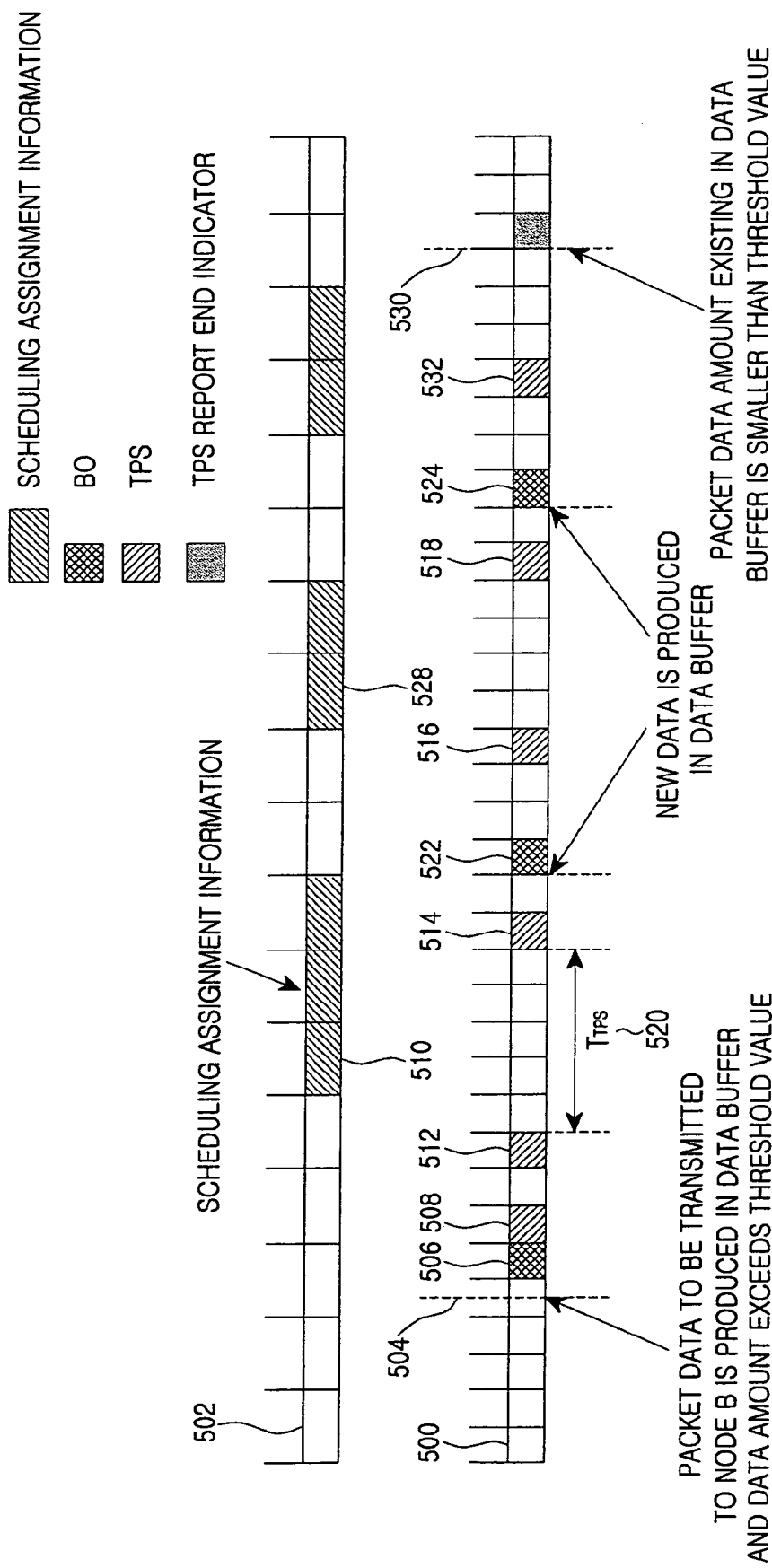
FIG. 5 is a diagram illustrating the transmission timing of buffer state information and transmission power status information according to a first embodiment of the present invention.

FIG. 5 is a diagram illustrating the transmission timing of the BO and TPS according to the first embodiment of the present invention.

Referring to FIG. 5, if data to be transmitted does not exist in the EUDCH packet data buffer, the UE does not start the report of the BO and the TPS (reference numeral 500). Accordingly, the Node B does not transmit the scheduling assignment information to the UE (reference numeral 502).

At the time point 504, the UE starts the transmission of the BO and the TPS if data that exceeds the specified threshold value exists in the EUDCH packet data buffer. That is, if data is newly produced in the buffer in a state that the threshold value is '0', the UE starts the transmission of the BO and the TPS. Reference numerals 506 and 508 denote start time points of the BO and TPS transmission, respectively.

When the UE informs the Node B of the BO through the MAC-e control signaling, it carries the TPS on the same MAC-e PDU to transmit the TPS. This means that the UE reports the start of the TPS report to the Node B. That is, it is called the 'start of the transmission power status report'.

Then, the BO is transmitted when new data is produced in the data buffer and the amount of data existing in the buffer becomes larger than the threshold value for scheduling. The TPS is transmitted for a specified period ($T_{TPS}$) 520. This is called the 'continuation of the transmission power status report'. The transmission of the TPS for the specified period is indicated by reference numerals 512, 514, 516, 518 and 532. The transmission of the BO is indicated by reference numerals 522 and 524. The transmission period and the offset of the TPS are reported in advance from a radio network controller (RNC) to the UE and the Node B through a radio resource control (RRC) and Iub signaling.

Meanwhile, if the Node B receives the BO and the TPS from the UE as described above, it transmits the corresponding scheduling assignment information through a predetermined downlink channel. The transmission of the scheduling assignment information is indicated by reference numerals 510 and 528.

The UE continuously monitors the data buffer, and if data of which the amount is smaller than the specified threshold value exists in the data buffer, it transmits an end indicator 530 to the Node B. In this case, the end indicator may be a separate indicator signal that directly informs the Node B that the TPS report will end.

Meanwhile, the end of the TPS report may implicitly be indicated by transmitting the BO that indicates that the amount of data that presently exists in the buffer is smaller than the threshold value. If the end indicator is received, the Node B can recognize that the TPS will not be reported from the UE any more as the data of which the amount is smaller than the specified threshold value exists in the buffer. This is called the 'end of the transmission power status report'.

Figure 6:
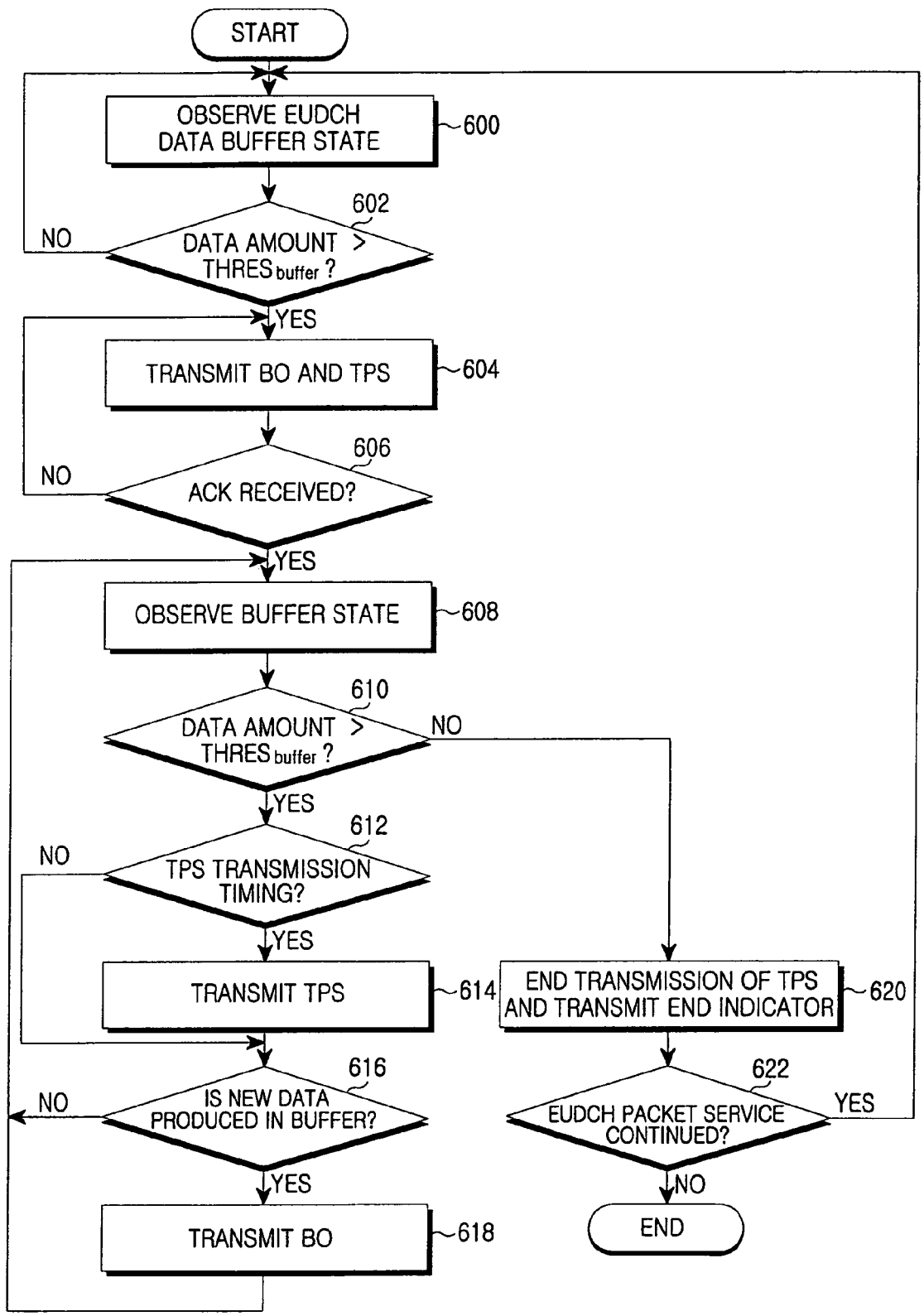
FIG. 6 is a flowchart illustrating the operational procedure of a UE according to a first embodiment of the present invention.

FIG. 6 is a flowchart illustrating the operational procedure of the UE according to the first embodiment of the present invention. In this case, it is assumed that the amount of data that exists in the EUDCH packet data buffer of the UE does not exceed the specified threshold value, and thus the report of the BO and the TPS does not start.

Referring to FIG. 6, the UE continuously monitors the amount of data stored in the EUDCH packet data buffer at step 600. The UE determines whether the amount of data stored in the EUDCH packet data buffer exceeds the threshold value $THRES_{buffer}$ for the scheduling due to the production of new data at step 602.

If the amount of data to be transmitted exceeds the threshold value $THRES_{buffer}$, the UE proceeds to step 604, and transmits the BO and the TPS to the Node B to report the start of the TPC report. At that time, the BO and the TPS are reported through the MAC-e signaling using the EUDCH packet data transmission. The BO and the TPS are carried on the same MAC-e PDU to be transmitted.

However, even if the data stored in the data buffer does not exceed the threshold value, it is possible for the UE to perform an autonomous transmission of the data stored in the data buffer without any scheduling of the Node B. In the case in which the threshold value is set to '0', it is impossible for the UE to perform the autonomous transmission of the data.

At step 606, the UE monitors if the ACK signal is received corresponding to the transmitted BO and the TPS. If the NACK signal is received instead of the ACK signal, the UE returns to step 604, and retransmits the BO and the TPS previously transmitted. Otherwise, if the ACK signal is received, the UE proceeds to step 608, and continuously observes the state of the data buffer. Thereafter, the UE determines whether data of which the amount exceeds the specified threshold value exits in the data buffer at step 610. If the data of which the amount exceeds the specified threshold value exits in the data buffer, the UE proceeds to step 612, and confirms the period for TPS transmission, that is, whether the transmission time of the TPS arrives. If the transmission time of the TPS arrives, the UE transmits the TPS at step 614.

If it is determined that the transmission of the TPS is completed or the transmission time of the TPS does not arrive, the UE proceeds to step 616, and confirms whether new data is produced in the data buffer. If new data is produced in the data buffer, the UE proceeds to step 618, and transmits the BO based on the new data. If new data is not produced or the transmission of the BO is completed, the UE proceeds to step 608, and continuously monitors the data buffer.

Meanwhile, if the data of which the amount exceeds the specified threshold value does not exist in the data buffer at step 610, the UE proceeds to step 620. At step 620, the UE ends the transmission of the TPS, and transmits the TPS report end indicator that indicates that the TPS will not be transmitted any more to the Node B. Then, at step 622, the UE determines whether to continue the packet data service by the EUDCH. If it is determined to continue the packet data service, the UE proceeds to step 600.

Figure 7:
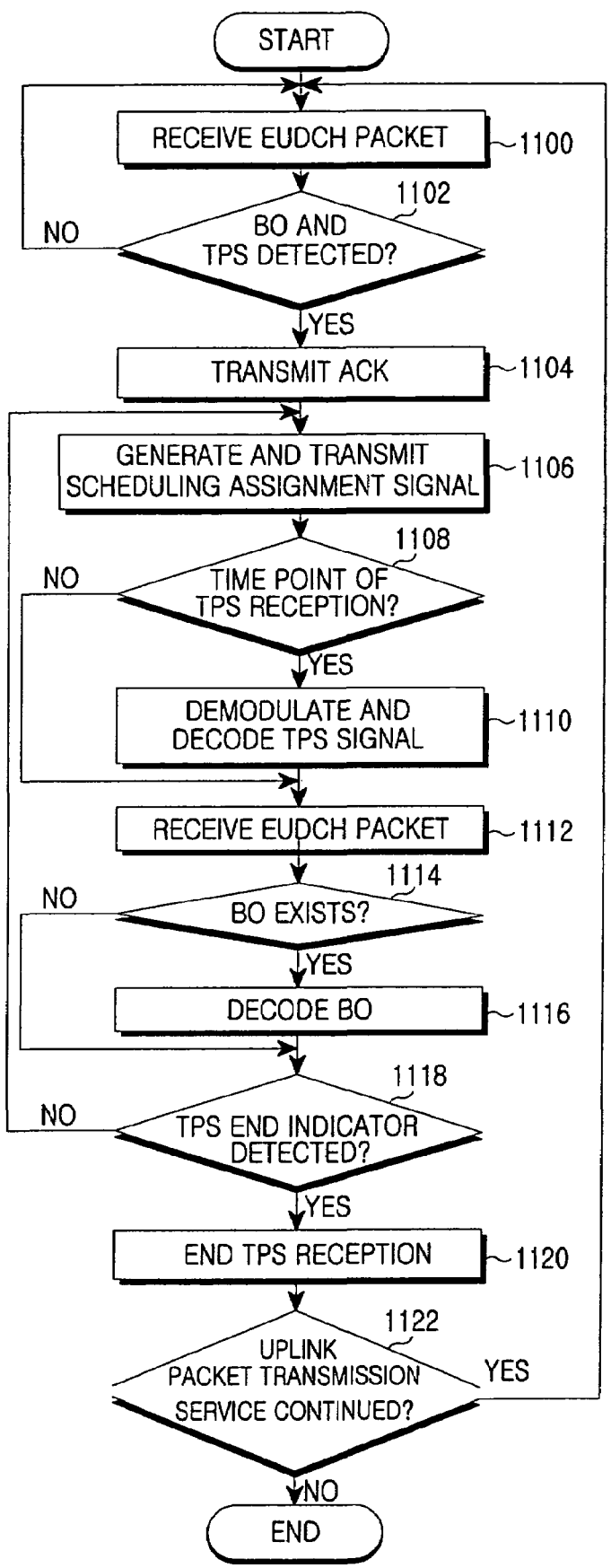
FIG. 7 is a flowchart illustrating the operational procedure of a Node B according to a first embodiment of the present invention.

FIG. 7 is a flowchart illustrating the operational procedure of the Node B according to the first embodiment of the present invention. In this case, it is assumed the amount of data that exists in the EUDCH packet data buffer of the UE does not exceed the specified threshold value, and thus the report of the BO and the TPS does not start.

Referring to FIG. 7, the Node B receives the EUDCH packet at step 1100. Then, the Node B proceeds to step 1102, and confirms whether the BO and TPS are detected. If the BO and the TPS are not detected, the Node B proceeds to step 1100, and continuously receives the EUDCH packet. If the BO and the TPS are detected, the Node B proceeds to step 1104, and transmits the ACK signal. Then, the Node B proceeds to step 1106, generates and transmits a scheduling assignment signal corresponding to the TPS to the UE.

At step 1108, the Node B confirms whether the time point of TPS reception arrives, and if so, demodulates and decodes the received TPS at step 1110.

Then, the Node proceeds to step 1112, receives the EUDCH packet, and then checks whether the BO or TPS end indicator is detected at steps 1114 and 1118. If it is checked that the BO is detected at step 1114, the Node B performs the decoding of the BO at step 1116. At step 1118, if the TPS end indicator is not detected, the Node B proceeds to step 1106.

If the TPS end indicator is detected, the Node B proceeds to step 1120, and ends the reception of the TPS. Then, the Node B confirms whether the EUDCH packet service continues at step 1122. If the EUDCH packet service continues, the Node B proceeds to step 1100.

The operation according to the first embodiment of the present invention as described above is summarized as follows.

1. Start: Start of TPS Report Through MAC-e Signaling of BO and TPS

At an initial stage, no data exists in the EUDCH packet data buffer of the UE, and the report of the BO and the TPS does not start (500). Accordingly, the Node B does not transmit the scheduling assignment information to the UE (502). The UE continuously observes the EUDCH packet data buffer (step 600), and if new data is produced in the EUDCH packet data buffer and the amount of data exceeds the threshold value $THRES_{buffer}$ for the scheduling (504 and step 602), the UE reports the BO to the Node B through the MAC-e control signaling using the EUDCH packet data transmission (506). In this state, if the amount of data existing in the buffer exceeds the threshold value, the UE itself can perform an autonomous transmission of the data stored in the data buffer without any scheduling of the Node B. In the case in which the threshold value is set to '0', it is impossible for the UE to perform the autonomous transmission of the data.

When the UE informs the Node B of the BO through the MAC-e signaling, it reports the start of the TPS report to the Node B by carrying the TPS on the same MAC-e PDU to be transmitted (508 and step 604). The Node B receives the EUDCH packet that comprises the BO and the TPS (step 1100), and recognizes the TPS through the decoding of the MAC-e PDU of the packet (step 1102). If the MAC-e PDU is successfully received, the Node B transmits the ACK signal to the UE (step 1104) to inform the UE that the Node B has successfully received the TPS (step 606). Another advantage of the above-described signaling method is that the UE transmits the TPS when it transmits the initial BO, and thus the BO the Node B can transmit the scheduling assignment information to the UE by promptly performing the scheduling.

2. Continuation

If the report of the TPS transmission start is successfully performed, the UE transmits the TPS for a specified period $T_{TPS}$ (520 and step 612) through the physical layer signaling (512, 514, 516, 518, 532 and step 614), and the Node B receives the TPS for the same period (step 1108 and 1110). The transmission period and the offset of the TPS are reported in advance from the radio network controller (RNC) to the UE and the Node B through a radio resource control (RRC) and Iub signaling.

The TPS physical layer signaling can be performed through the EUDCH service dedicated control physical channel (EU-DPCCH). Meanwhile, in the case of the BO, the specified threshold value test is performed when new data is produced in the EUDCH data buffer of the UE (step 616), and then the BO is transmitted through the MAG-e control signaling (522, 524 and step 618). If the newly transmitted TPS information (522) is received after the initial BO report from the UE (steps 1114 and 1116), the Node B transmits new scheduling assignment information based on the BO and the recently received TPS (528 and step 1106). As described above, the UE periodically reports the TPS to the Node B through the physical layer signaling, and reports the BO through the MAC-e control signaling whenever necessary.

3. End: The UE Reports the End Report to the Node B Using the MAC-e or Physical Layer Signaling.

If the amount of data existing in the EUDCH packet data buffer is smaller than the threshold value for the scheduling (step 612), the UE ends the TPS report. If the TPS report ends, the UE does not transmit the TPS any more, and sends the end indicator to the Node B (step 620). The Node B, if it receives the TPS end report from the UE (step 1118), does not perform the demodulation of the TPS any more (step 1120).

In order to perform the above-described end report operation, two signaling methods may be used as follows.

1) MAC-e Control Signaling

The UE reports the end of the TPS report to the Node B through the MAC-e control signaling. For example, if the amount of data existing in the EUDCH packet data buffer becomes smaller than the threshold value (530) when it transmits the EUDCH packet, the UE carries the end indicator on the MAC-e header of the EUDCH packet (532) to be transmitted to the Node B. As described above, a separate indicator for directly informing the Node B that the TPS report will end or the BO that indicates that the amount of packet data existing in the buffer is smaller than the threshold value may be used as the end indicator. Meanwhile, if new data is produced in the UE buffer after the end indicator is sent, the report start process as described above is performed again.

2) Physical Layer Signaling (1) Separate Definition of TPS Value for End Indicator In the case of reporting the TPS report end using the physical layer signaling, the UE sends the end report information to the Node B through the EUDCH service dedicated control physical channel after the last EUDCH packet is successfully transmitted. For the above-described end report, one value of the TPS is set for the end indicator, and the UE transmits the corresponding TPS value when it intends to transmits the end indicator to the Node B. If the received TPS value is a value set for the end indicator, the Node B recognizes that the UE will not transmit the TPS any longer, and then does not perform the TPS reception.

(2) Setting of Separate Physical Channel Field for End Indicator

One field of the EUDCH dedicated control physical channel is set to the dedicated field for carrying and sending the end indicator. The UE sets a value that indicates the end report in the field and transmits the value to the Node B if it intends to end the TPS report. The Node B can recognize the TPS end after a normal demodulation of the field.

Second Embodiment

Hereinafter, in the second embodiment of the present invention, a scheme for implicit start report using the BO and implicit end report using the BO will be explained in detail.

Figure 8:
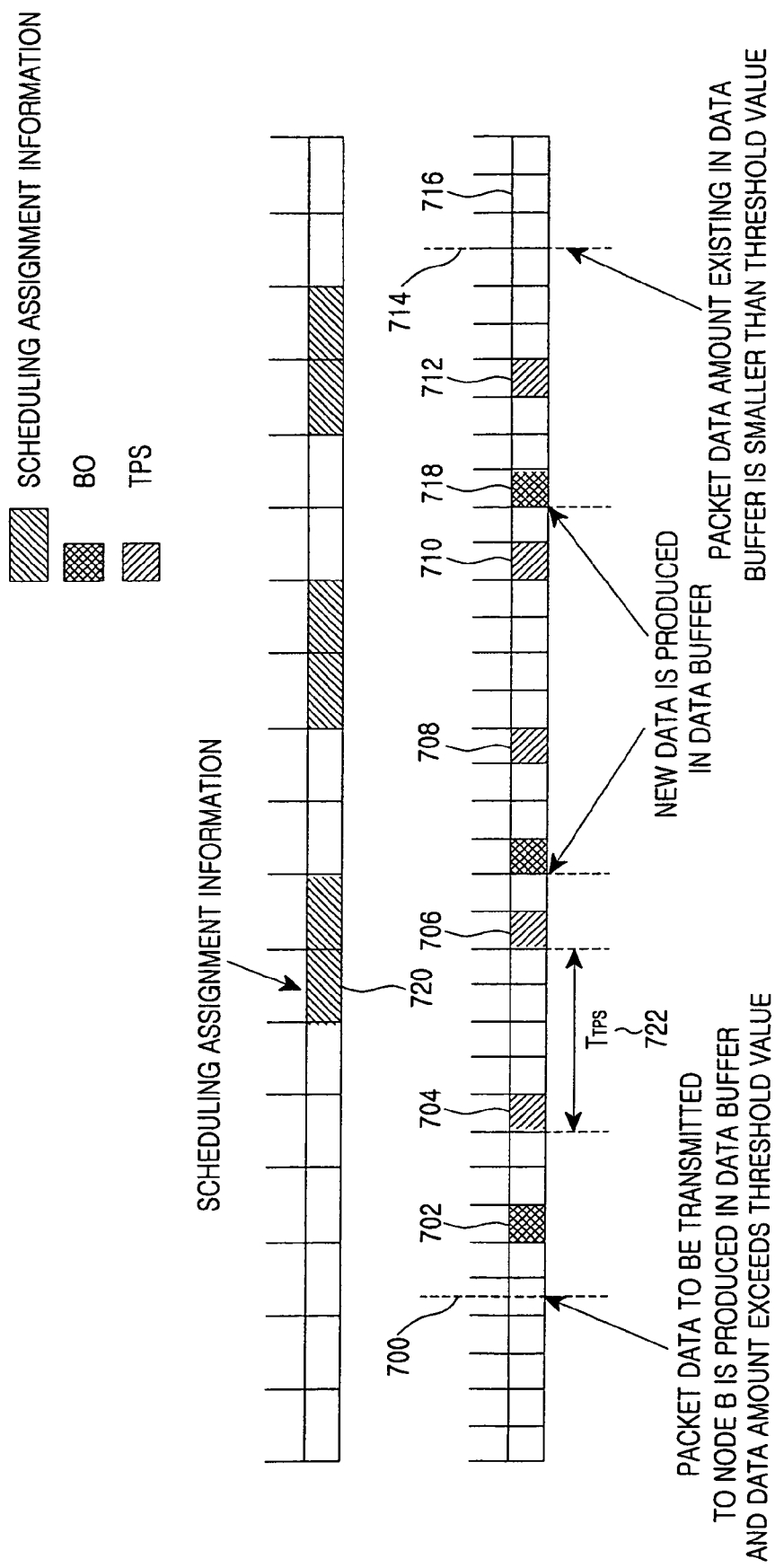
FIG. 8 is a diagram illustrating the transmission timing of buffer state information and transmission power status information according to a second embodiment of the present invention.

FIG. 8 is a view illustrating the transmission timing of the BO and the TPS according to the second embodiment of the present invention.

Referring to FIG. 8, if data to be transmitted does not exist in the EUDCH packet data buffer, the UE does not start the report of the BO. Accordingly, the Node B does not transmit the scheduling assignment information to the UE.

At the time point 700, the UE starts the transmission of the BO if data that exceeds the specified threshold value exists in the EUDCH packet data buffer. Reference numeral 702 denotes a start time point of the BO transmission. The BO is reported to the Node B through the MAC-e control signaling. This means that the UE reports the start of the TPS report to the Node B. That is, it is called the 'start of the transmission power status report'. This is because the Node B can confirm that the data to be transmitted from the UE exceeds the specified threshold value through the BO. That is, the Node B can recognize the start of the TPS transmission when the amount of data to be transmitted by the UE exceeds the specified threshold value.

Then, the BO is transmitted after passing through a threshold value test if new data is produced in the data buffer. The TPS is transmitted for a specified period ($T_{TPS}$). This is called the 'continuation of the transmission power status report'. Accordingly, the Node B receives the TPS transmitted for a specified period, and transmits the corresponding scheduling assignment information to the UE.

The UE continuously monitors the data buffer, and if data of which the amount is smaller than the specified threshold value exists in the data buffer, it ends the periodic report of the TPS. Meanwhile, the Node B can recognize that the TPS report ends by the BO information and the amount of data that the Node B has received. This is called the 'end of the transmission power status report'.

Alternatively, the Node B may transmit the TPS report end indicator to the UE. In this case, if the UE receives the TPS report end indicator in a state that the amount of data to be transmitted by itself exceeds the specified threshold value, it can re-perform the TPS report start process.

Figure 9:
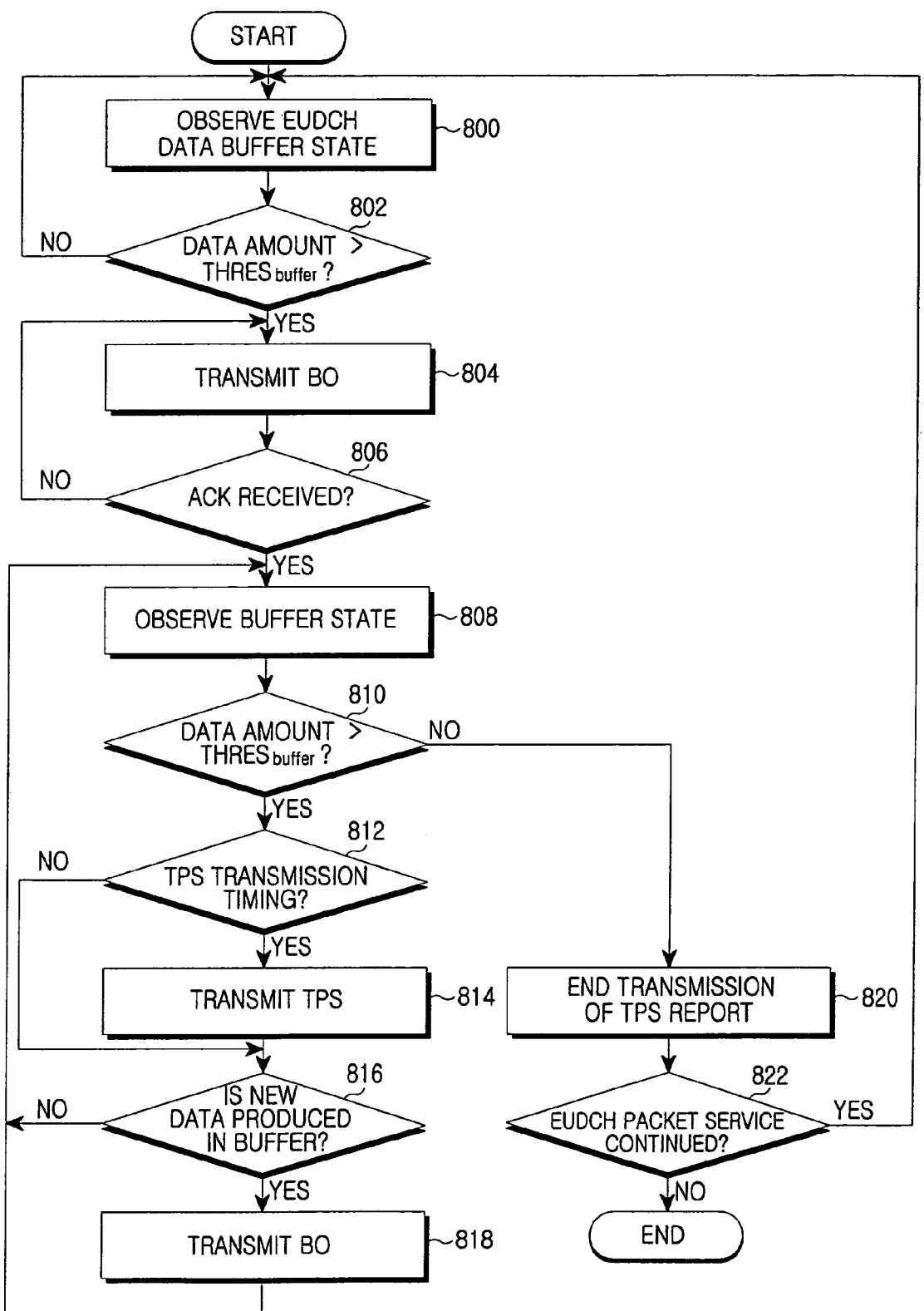
FIG. 9 is a flowchart illustrating the operational procedure of a UE according to a second embodiment of the present invention.

FIG. 9 is a view illustrating the operational procedure of the UE according to the second embodiment of the present invention. In this case, it is assumed that the amount of data that exists in the EUDCH packet data buffer of the UE does not exceed the specified threshold value, and thus the report of the TPS does not start.

Referring to FIG. 9, the UE continuously monitors the amount of data stored in the EUDCH packet data buffer at step 800. The UE determines whether the amount of data stored in the EUDCH packet data buffer exceeds the threshold value $THRES_{buffer}$ for the scheduling due to the production of new data at step 802.

If the amount of data to be transmitted exceeds the threshold value $THRES_{buffer}$, the UE proceeds to step 804, and transmits the BO to the Node B to report the start of the TPC report. At that time, the BO is reported through the MAC-e signaling using the EUDCH packet data transmission.

At step 806, the UE monitors if the ACK signal is received corresponding to the transmitted BO. If the NACK signal is received instead of the ACK signal, the UE returns to step 804, and retransmits the BO previously transmitted. Otherwise, if the ACK signal is received, the UE proceeds to step 808, and continuously observes the state of the data buffer. Thereafter, the UE determines whether data of which the amount exceeds the specified threshold value exist in the data buffer at step 810. If the data of which the amount exceeds the specified threshold value exist in the data buffer, the UE proceeds to step 812, and confirms the period for the TPS transmission, that is, whether the transmission time of the TPS arrives. If the transmission time of the TPS arrives, the UE transmits the TPS at step 814.

If it is determined that the transmission of the TPS is completed or the transmission time of the TPS does not arrive, the UE proceeds to step 816, and confirms whether new data is produced in the data buffer. If new data is produced in the data buffer, the UE proceeds to step 818, and transmits the BO based on the new data. If new data is not produced or the transmission of the BO is completed, the UE returns to step 808, and continuously monitors the data buffer.

Meanwhile, if the data of which the amount exceeds the specified threshold value does not exist in the data buffer at step 810, the UE proceeds to step 820. At step 820, the UE ends the transmission of the TPS, and determines whether to continue the packet data service by the EUDCH at step 822. If it is determined to continue the packet data service, the UE returns to step 800.

Figure 10:
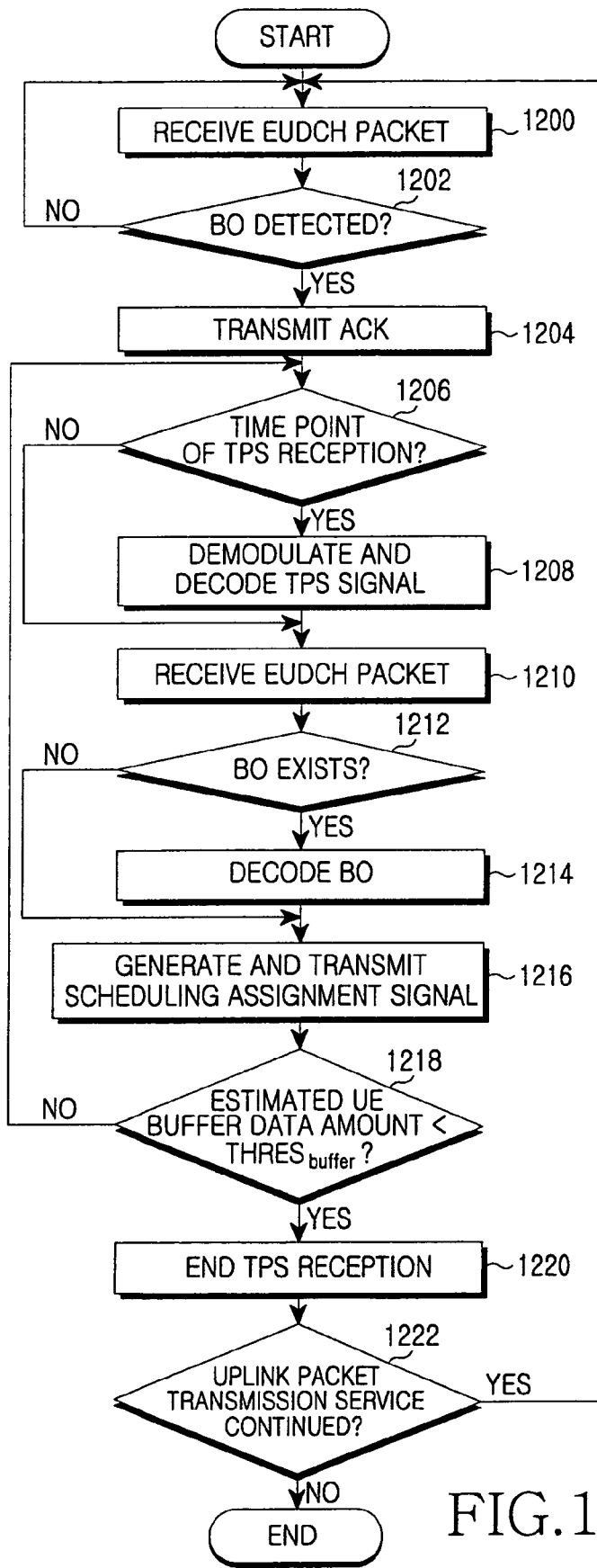
FIG. 10 is a flowchart illustrating the operational procedure of a Node B according to a second embodiment of the present invention.

FIG. 10 is a flowchart illustrating the operational procedure of the Node B according to the second embodiment of the present invention. In this case, it is assumed the amount of data that exists in the EUDCH packet data buffer of the UE does not exceed the specified threshold value, and thus the report of the TPS does not start.

Referring to FIG. 10, the Node B receives the EUDCH packet at step 1200. Then, the Node B proceeds to step 1202, and confirms whether the BO is detected. If the BO is not detected, the Node B returns to step 1200, and continuously receives the EUDCH packet. If the BO is detected, the Node B proceeds to step 1204, and transmits the ACK signal. Then, the Node B proceeds to step 1206, confirms whether the time for the TPS reception arrives, and performs the demodulation and decoding of the received TPS at step 1208 if the time for the TPS reception arrives.

At step 1210, the Node B receives the EUDCH packet, and then determines whether the BO exists at step 1212. If it is determined that the BO exists at step 1212, the Node B performs the decoding of the BO at step 1214. If the BO does not exist or the decoding of the BO is completed at step 1212, the Node B proceeds to step 1216. The Node B generates and transmits the scheduling assignment signal corresponding to the TPS to the UE at step 1216.

The Node B estimates the amount of data to be transmitted from the UE by the BO, and confirms whether the estimated amount of data exceeds the specified threshold value $THRES_{buffer}$ at step 1218. If the estimated amount of data is not smaller than the $THRES_{buffer}$, the Node B returns to step 1205. If the estimated amount of data is smaller than the $THRES_{buffer}$, the Node B ends the reception of the TPS at step 1220. Then, the Node B confirms whether the EUDCH packet service continues at step 1222. If it is determined that the EUDCH packet service continues, the Node B returns to step 1200.

The operation according to the second embodiment of the present invention as described above is summarized as follows.

1. Start: Implicit Start Report Using BO

Unlike the first embodiment of the present invention in that the start of the TPS report starts using the MAC-e control signaling, the UE does not transmit any special start indicator to the Node B in the second embodiment of the present invention.

The UE continuously monitors the EUDCH packet data buffer (step 800), and if the new data is produced and the amount of data in the buffer exceeds the threshold value (700 and step 802), the UE reports the BO to the Node B through the MAC-e control signaling (702 and step 804), but does not transmit the TPS during the signaling process. However, if the BO value received from the UE is larger than the threshold value for the scheduling (step 1202), the Node B can recognize that the UE will start the TPS transmission. Additionally, if the UE receives the ACK signal transmitted from the Node B (step 1204) after the Node B decodes the MAC-e PDU that comprises the BO (step 806), the UE can recognize that the Node B has normally received the BO and thus is ready to receive the TPS.

2. Continuation

The process of transmitting the BO and the TPS from the UE to the Node B after the UE's initial transmission of the BO as described above is the same as that in the first embodiment of the present invention. At the first TPS transmission timing (704) after the initial transmission of the BO, the UE carries and sends the TPS through the EUDCH dedicated control physical channel (704), and the Node B can receive the TPS transmitted by the UE through the implicit report process of the TPS transmission start (step 1208). The Node B sends the scheduling assignment information to the UE after it receives the TPS (720 and step 1216). Additionally, the Node B receives the TPS periodically (812) transmitted by the UE (706, 708, 710, 712 and 814) from the time point of the initial TPS transmission.

3. End: Implicit End Report Using BO

In order for the UE and the Node B to implicitly end the transmission and reception of the TPS, the BO and the amount of EUDCH packet data received by the Node B may be used. If the amount of data existing in the EUDCH packet data buffer is smaller than the threshold value for the scheduling (714 and step 812), the UE ends the TPS report (716 and step 820). However, the UE does not transmit the end indicator of the TPS report to the Node B.

The Node B compares the most recently received BO (718) with the amount of EUDCH data received after the BO, and if the amount of data existing in the EUDCH packet data buffer is smaller than the threshold value for the scheduling (step 1218), the Node B recognizes that the UE will not transmit the TPS any more and thus does not receive the TPS any more (step 1220). Through the above-described process, the TPS report can implicitly end.

Meanwhile, in the above-described process, the Node B may inform the UE that the TPS reception ends through the EUDCH dedicated physical control channel. If the Node sends the end indicator although the data of which the amount exceeds the threshold value exists in the buffer of the UE, the UE will re-perform the TPS report start process.

Third Embodiment

Hereinafter, in the third embodiment of the present invention, a scheme for implicit start report using the BO and end report by the Node B will be explained in detail.

Figure 11:
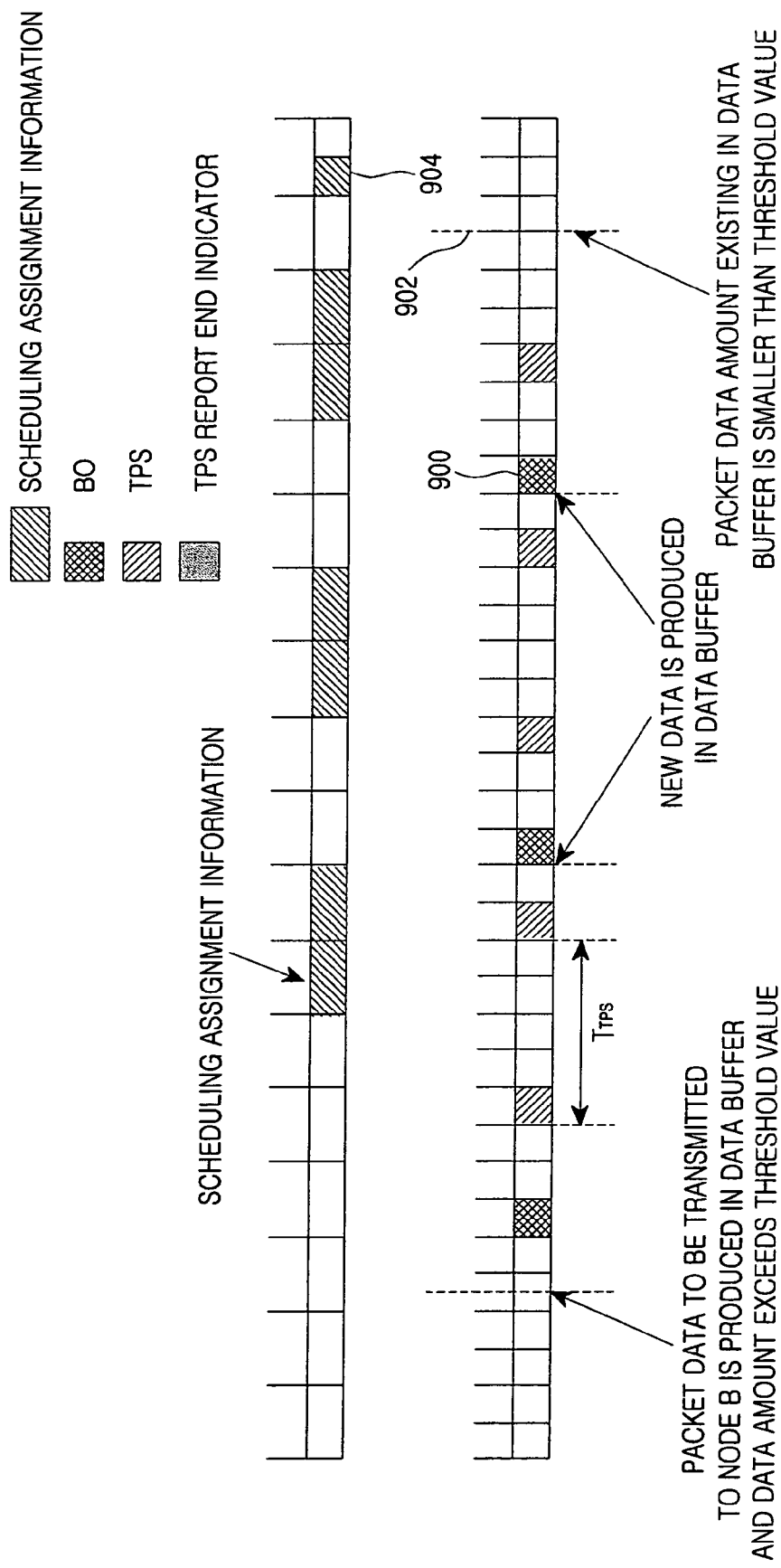
FIG. 11 is a diagram illustrating the transmission timing of buffer state information and transmission power status information according to a third embodiment of the present invention.

FIG. 11 is a view illustrating the transmission timing of the BO and the TPS according to the third embodiment of the present invention.

Referring to FIG. 11, if data to be transmitted does not exist in the EUDCH packet data buffer, the UE does not start the report of the BO. Accordingly, the Node B does not transmit the scheduling assignment information to the UE.

The UE starts the transmission of the BO if data that exceeds the specified threshold value exists in the EUDCH packet data buffer. The BO is reported to the Node B through the MAC-e control signaling. This means that the UE reports the start of the TPS report to the Node B. That is, it is called the 'start of the transmission power status report'. This is because the Node B can confirm that the data to be transmitted from the UE exceeds the specified threshold value through the BO. That is, the Node B can recognize the start of the TPS transmission when the amount of data to be transmitted by the UE exceeds the specified threshold value.

Then, the BO is transmitted after passing through a threshold value test if new data is produced in the data buffer. The TPS is transmitted for a specified period ($T_{TPS}$). This is called the 'continuation of the transmission power status report'. Accordingly, the Node B receives the TPS transmitted for a specified period, and transmits the corresponding scheduling assignment information to the UE.

The Node B can recognize that the TPS report ends by the BO information and the amount of data received by the Node B itself. This is called the 'end of the transmission power status report'. In this case, the Node B transmits the TPS report end indicator to the UE. If the TPS report end indicator is received from the Node B in a state that the UE continuously transmits the TPS, the UE ends the periodic report of the TPS. Meanwhile, if the UE receives the TPS report end indicator in a state that the amount of data to be transmitted by the UE itself exceeds the specified threshold value, the UE can re-perform the TPS report start process.

Figure 12:
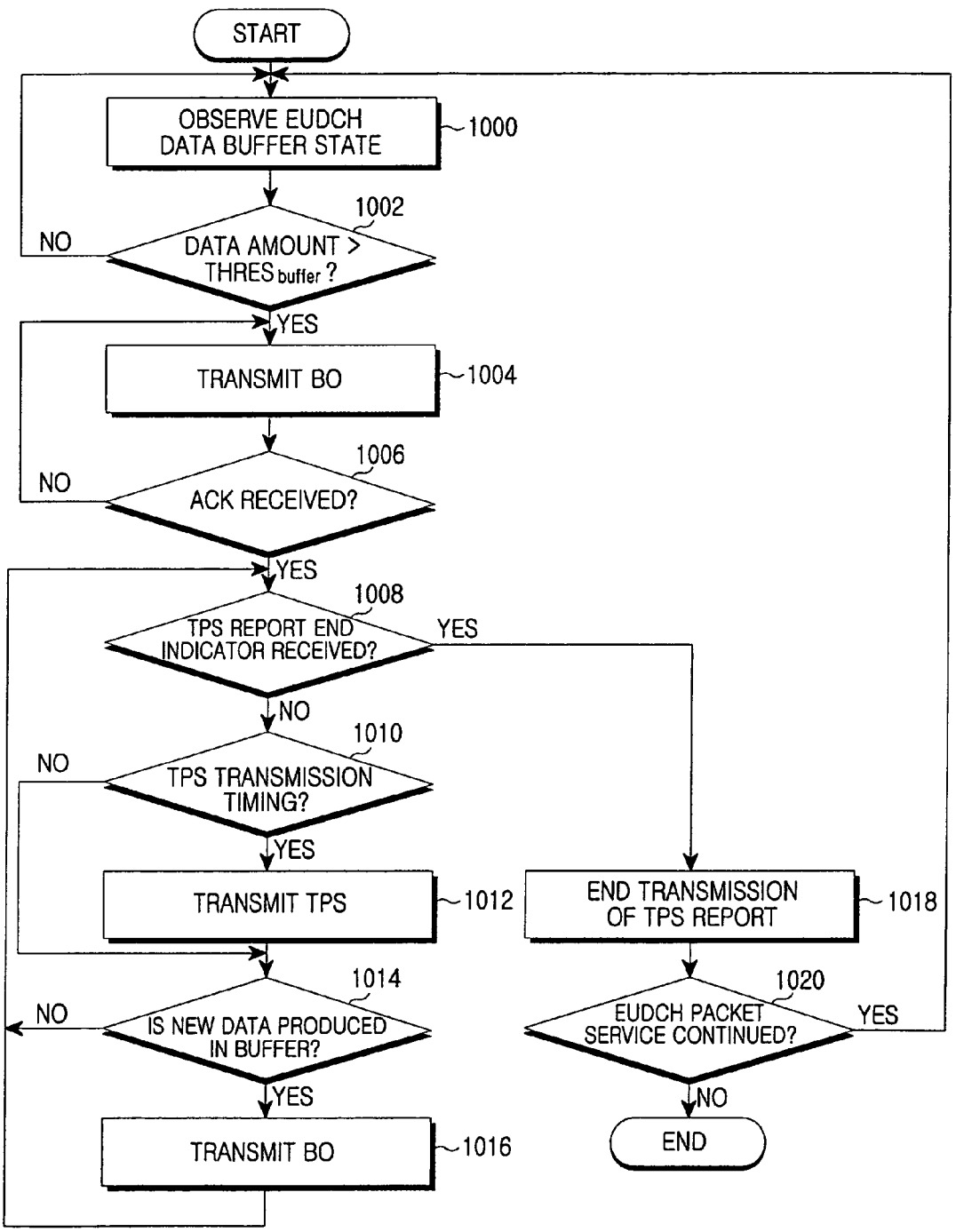
FIG. 12 is a flowchart illustrating the operational procedure of a UE according to a third embodiment of the present invention.

FIG. 12 is a flowchart illustrating the operational procedure of the UE according to the third embodiment of the present invention. In this case, it is assumed that the amount of data that exists in the EUDCH packet data buffer of the UE does not exceed the specified threshold value, and thus the report of the TPS does not start.

Referring to FIG. 12, the UE continuously observes the amount of data stored in the EUDCH packet data buffer at step 1000. The UE determines whether the amount of data stored in the EUDCH packet data buffer exceeds the threshold value $THRES_{buffer}$ for the scheduling due to the production of new data at step 1002.

If the amount of data to be transmitted exceeds the threshold value $THRES_{buffer}$, the UE proceeds to step 1004, and transmits the BO to the Node B to report the start of the TPC report. At that time, the BO is reported through the MAC-e signaling using the EUDCH packet data transmission.

At step 1006, the UE monitors if the ACK signal is received corresponding to the transmitted BO. If the NACK signal is received instead of the ACK signal, the UE returns to step 1004, and retransmits the BO previously transmitted. Otherwise, if the ACK signal is received, the UE proceeds to step 1008, and monitors whether the TPS report end indicator is received from the Node B.

If the TPS report end indicator is not received, the UE confirms the period for the TPS transmission, that is, whether the transmission time of the TPS arrives at step 1010. If the transmission time of the TPS arrives, the UE transmits the TPS at step 1012.

If it is determined that the transmission of the TPS is completed or the transmission time of the TPS does not arrive, the UE proceeds to step 1014, and confirms whether new data is produced in the data buffer. If new data is produced in the data buffer, the UE proceeds to step 1016, and transmits the BO based on the newly produced data. If new data is not produced or the transmission of the BO is completed, the UE returns to step 1008, and continuously monitors the data buffer.

Meanwhile, if the TPS report end indicator is received at step 1008, the UE proceeds to step 1018. At step 1018, the UE ends the transmission of the TPS, and determines whether to continue the packet data service by the EUDCH at step 1020. If it is determined to continue the packet data service, the UE proceeds to step 1000.

Figure 13:
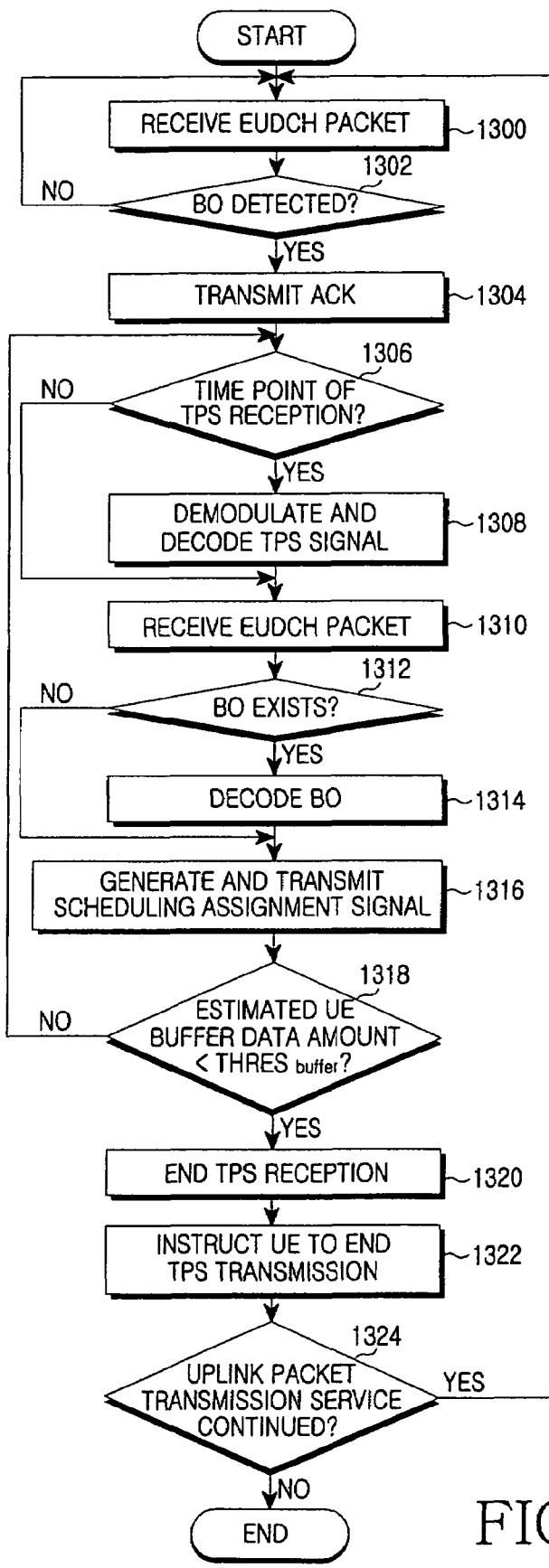
FIG. 13 is a flowchart illustrating the operational procedure of a Node B according to a third embodiment of the present invention.

FIG. 13 is a view illustrating the operational procedure of the Node B according to the third embodiment of the present invention. In this case, it is assumed the amount of data that exists in the EUDCH packet data buffer of the UE does not exceed the specified threshold value, and thus the report of the TPS does not start.

Referring to FIG. 13, the Node B receives the EUDCH packet at step 1300. Then, the Node B proceeds to step 1302, and confirms whether the BO is detected. If the BO is not detected, the Node B returns to step 1300, and continuously receives the EUDCH packet. If the BO is detected, the Node B proceeds to step 1304, and transmits the ACK signal. Then, the Node B proceeds to step 1306, confirms whether the time for the TPS reception arrives, and performs the demodulation and decoding of the received TPS at step 1308 if the time for the TPS reception arrives.

At step 1310, the Node B receives the EUDCH packet, and then determines whether the BO exists at step 1312. If it is determined that the BO exists at step 1312, the Node B performs the decoding of the BO at step 1314. If the BO does not exist or the decoding of the BO is completed, the Node B proceeds to step 1316. The Node B generates and transmits the scheduling assignment signal corresponding to the TPS to the UE at step 1316.

The Node B estimates the amount of data to be transmitted from the UE by the BO, and confirms whether the estimated amount of data exceeds the specified threshold value $THRES_{buffer}$ at step 1318. If the estimated amount of data is not smaller than the $THRES_{buffer}$, the Node B returns to the step 1306. If the estimated amount of data is smaller than the $THRES_{buffer}$, the Node B ends the reception of the TPS at step 1320, and then transmits the TPS report end indicator to the UE at step 1322. Then, the Node B confirms whether the EUDCH packet service continues at step 1324. If it is determined that the EUDCH packet service continues, the Node B proceeds to step 1300.

The operation according to the third embodiment of the present invention as described above is summarized as follows.

1. Start: Start of Transmission of BO Only Using MAC-e Signaling

In the same method and procedure as the second embodiment of the present invention, the UE does not transmit a special start indicator to the Node B.

2. Continuation

This process is performed in the same method and procedure as the first embodiment of the present invention.

3. End: End Instruction by Node B Through Physical Layer Signaling

In the third embodiment of the present invention, the Node B directly determines the end of the TPS report, and informs the UE of the decision so that the UE does not transmit the TPS any longer. Accordingly, the UE continues the periodic transmission of the TPS (step 1014) until it receives the end instruction from the Node B. The Node B compares the most recently received BO (900) with the amount of EUDCH data received after the BO, and if the amount of data existing in the EUDCH packet data buffer is smaller than the threshold value for the scheduling (902 and step 1318), the Node B does not receive the TPS any longer (step 1320), and instructs the UE to end the TPS report through the physical layer signaling (904 and step 1322). If the UE receives the TPS report end indicator (step 1008), it ends the TPS report (step 1018).

For the physical layer signaling, a downlink control physical channel for the EUDCH service can be used. if the Node B sends the TPS report end indicator to the UE in a state that the data of which the amount exceeds the threshold value exists in the buffer of the UE, the UE may re-perform the TPS report start process. One advantage of the above-described method whereby the Node B instructs the UE to end the TPS report is that even if the amount of data existing in the EUDCH packet data buffer of the UE is smaller than the threshold value for the scheduling, the Node B can additionally receive the TPS report as needed in the Node B.

Transmitter Structure

Figure 14:
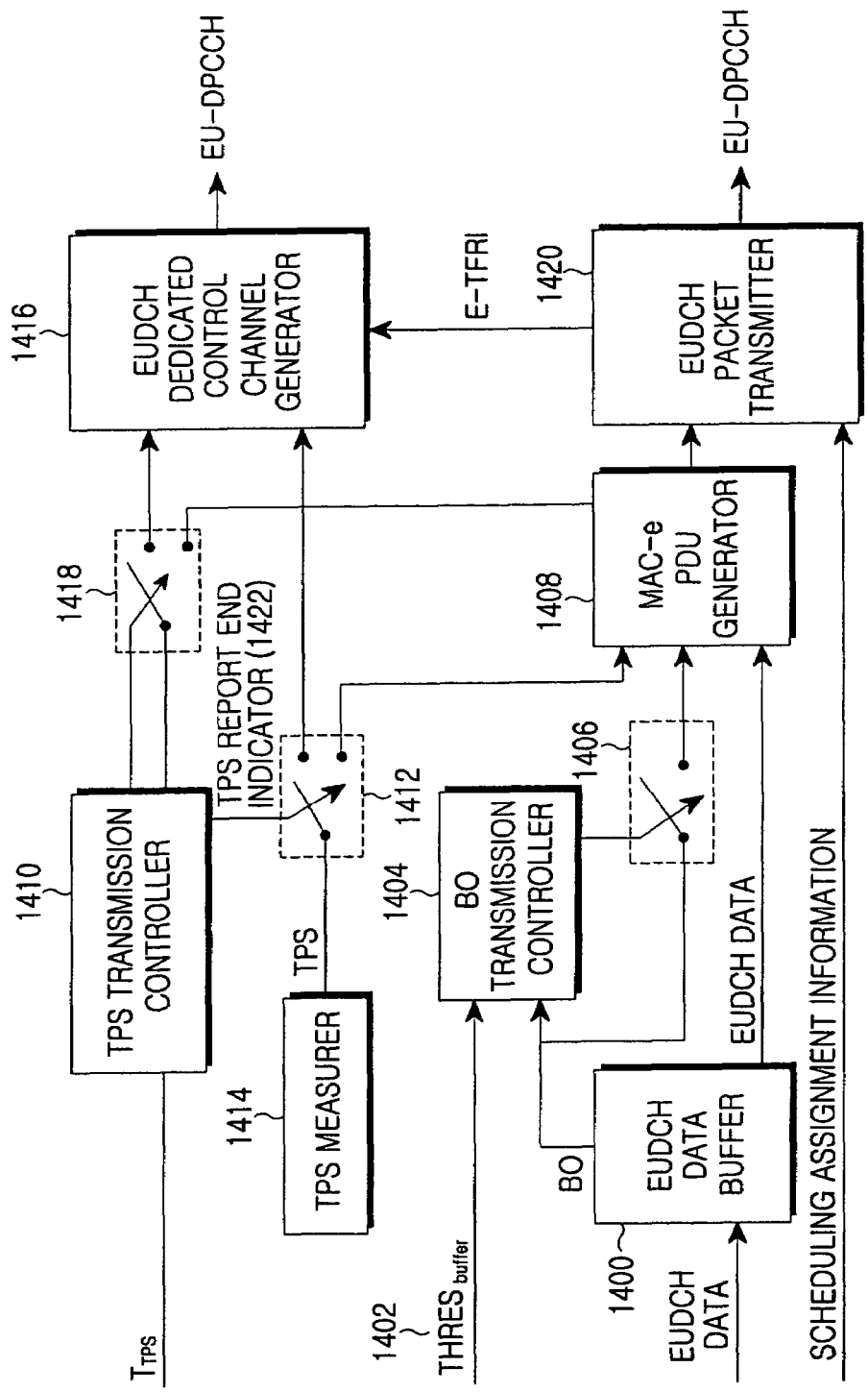
FIG. 14 is a diagram illustrating the construction of a transmitter of a UE for implementing the embodiments of the present invention.

FIG. 14 is a view illustrating the construction of a transmitter of the UE according to the embodiments of the present invention.

Referring to FIG. 14, if new data is input to an EUDCH data buffer 1400 in an initial state and the BO value exceeds the threshold value THRESbuffer 1402 for scheduling, a BO transmission controller 1404 turns on a switch 1406 so that the BO value is transmitted and input to a MAC-e PDU generator 1408 as a MAC-e control signaling. The MAC-e PDU generated by a MAC-e PDU generator 1408 passes through a channel coding and physical channel mapping processes, and then is transmitted to an EU-DPDCH channel.

A TPS transmission controller 1410 controls the transmission of the TPS information of the UE. Accordingly, in the first embodiment of the present invention, if the UE intends to send the TPS report start report to the Node B, it adjusts a TPS switch 1412, so that the TPS measured by a TPS measuring unit 1414 is input to the MAC-e PDU generator together with the BO.

Additionally, the TPS transmission controller 1410 operates to input the TPS to an EUDCH dedicated control channel generator 1416 for a TPS transmission period TTPS to carry the TPS on the EU-DPCCH channel.

Meanwhile, if the UE intends to report the TPS report to the Node B, the TPS transmission controller 1410 generates a TPS report end indicator 1422, and controls a switch 1418 to switch the generated TPS report end indicator to the MAC-e PDU generator 1408 or the EUDCH dedicated control channel generator 1416 according to the selected signaling type.

The EUDCH dedicated control channel generator 1416 transmits control information that comprises the E-TRFI and TPS to the Node B through the E-DPCH, and an EUDCH packet transmitter 1420 transmits the MAC-e PDU generated from the MAC-e PDU generator 1408 to the Node B through the EU-DPDCH.

Receiver Structure

Figure 15:
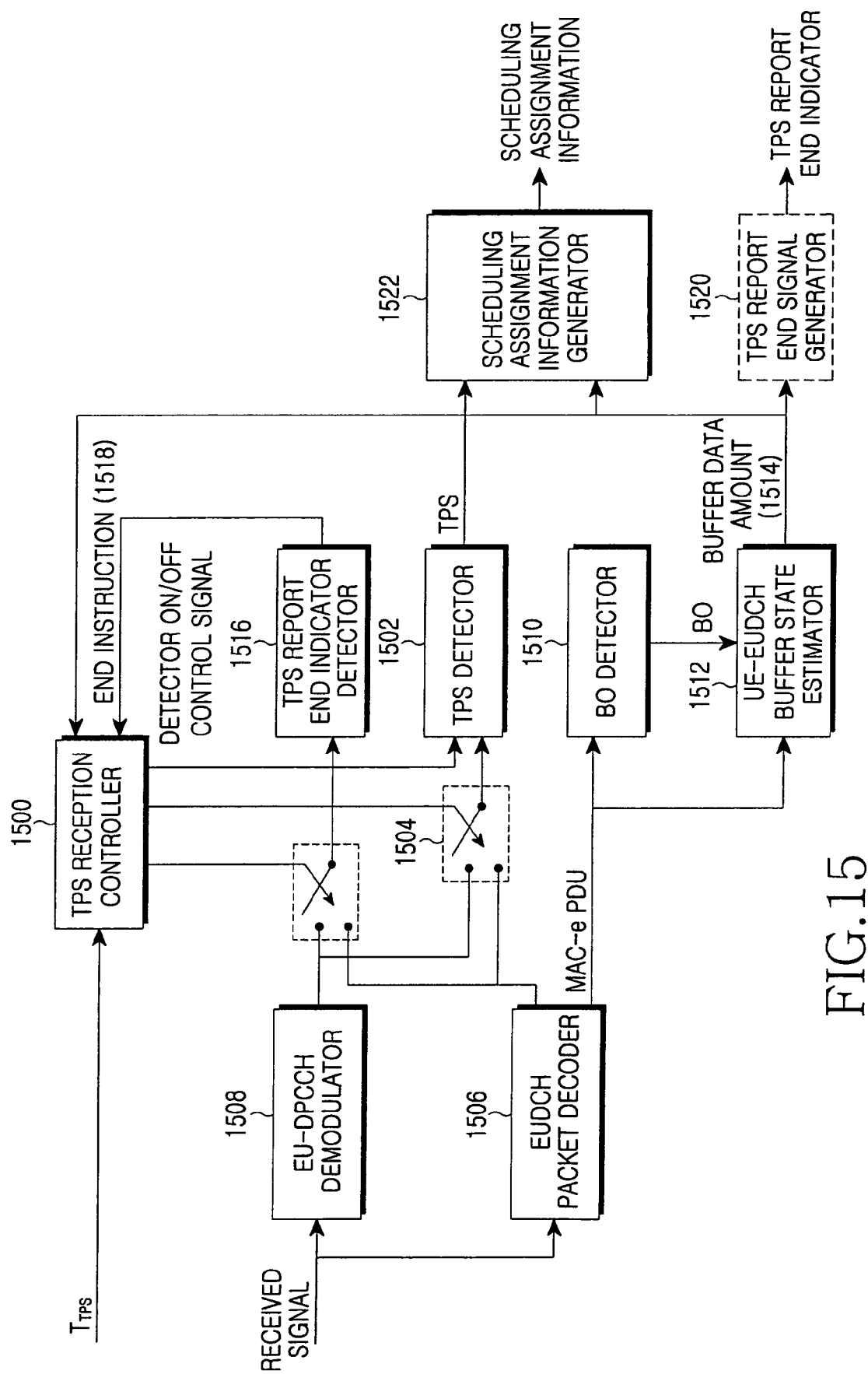
FIG. 15 is a diagram illustrating the construction of a receiver of a Node B for implementing the embodiments of the present invention.

FIG. 15 is a diagram illustrating the construction of a receiver of the Node B according to the embodiments of the present invention.

Referring to FIG. 15, a TPS reception controller 1500 controls a TPS Detector 1502. Accordingly, if the TPS report start report by the UE is applied as in the first embodiment, a switch 1504 switches an output of an EUDCH packet decoder 1506 to the TPS detector 1502, so that the TPS detector can detect the TPS transmitted through the MAC-e control signaling together with the BO.

If the initial TPS is detected as described above, the switch 1504 switches the output of the EU-DPCCH demodulator 1508 to the TPS detector 1502, so that the TPS transmitted through the EU-DPCCH for a period of TTPS can be detected. Meanwhile, a BO detector 1510 is a block for detecting the BO transmitted through the MAC-e PDU, and the BO and the amount of EUDCH data received are input to a buffer state estimator 1512, so that the Node B estimates the buffer state. The TPS and UE buffer state information are input to a block 1522, and the scheduling assignment information to be transmitted to the UE is generated.

Meanwhile, in the case of the implicit TPS report start as in the second embodiment of the present invention, the amount of the UE buffer data 1514 estimated by the buffer state estimator 1512 is input to the TPS reception controller 1500, and the periodic detection of the TPS starts if the amount of data existing in the EUDCH packet data buffer is larger than the threshold value for the scheduling In the same manner, in the case of the implicit TPS report end, the detection of the TPS ends if the amount of data 1514 is smaller than the threshold value. Meanwhile, in the case of the TPS report end, the end indicator detector 1516 detects the end indicator, and informs the TPS reception controller of the result of detection 1518, so that the detection of the TPS is not performed any longer.

Meanwhile, in the case in which the TPS report end is instructed by the Node B as in the third embodiment of the present invention, the block 1520 generates the TPS report end indicator based on the value of the buffer data amount estimated by the buffer state estimator 1512, and reports the generated TPS report end indicator to the UE.

As described above, according to the present invention, the transmission power status information is transmitted only when it is necessary in a mobile communication system that supports an uplink packet service, and thus unnecessary signaling overhead between a UE and a Node B is reduced to achieve an efficient use of wireless resources.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of efficiently providing transmission power status information (TPS) and buffer occupancy information (BO) of a user equipment (UE), in a mobile communication system, the method comprising the steps of:

confirming whether an amount of data to be transmitted by the UE exceeds a preset threshold value;

if the amount of data exceeds the threshold value, including the TPS and the BO of the UE in a protocol data unit (PDU) of a media access control layer (MAC-e);

reporting a start of a packet data service by transmitting the MAC-e PDU that comprises the TPS and the BO of the UE to a Node B through a MAC-e signaling; and reporting an occurrence of an indicator that indicates an end of the TPS transmission to the Node B through a MAC-e signaling if the amount of data to be transmitted by the UE is less than the threshold value.

2. The method as claimed in claim 1, further comprising the step of reporting a continuation of the packet data service by periodically transmitting the TPS of the UE through a dedicated physical control channel after reporting the start of the packet data service.

3. The method as claimed in claim 1, further comprising the step of reporting a continuation of the packet data service by transmitting the BO of the UE to the Node B through a MAC-e signaling whenever a new data is produced in a buffer of the UE and an amount of the new data to be transmitted by the UE exceeds the threshold value after reporting the start of the packet data service.

4. The method as claimed in claim 3, wherein the BO is a total amount of data in the buffer of the UE, or data newly produced after reporting a previous BO.

5. A method of efficiently providing transmission power status information (TPS) and buffer occupancy information (BO) of a user equipment (UE), in a mobile communication system, the method comprising the steps of:

confirming whether an amount of data to be transmitted by the UE exceeds a preset threshold value;

if the amount of data exceeds the threshold value, including the TPS and the BO of the UE in a protocol data unit (PDU) of a media access control layer (MAC-e);

reporting a start of a packet data service by transmitting the MAC-e PDU that comprises the TPS and the BO of the UE to a Node B through a MAC-e signaling; and ending the TPS transmission if the amount of data to be transmitted by the UE is less than the threshold value.

6. The method as claimed in claim 5, further comprising the step of reporting a continuation of the packet data service by periodically transmitting the TPS of the UE through a dedicated physical control channel after reporting the start of the packet data service.

7. The method as claimed in claim 5, further comprising the step of reporting a continuation of the packet data service by transmitting the BO of the UE to the Node B through a MAC-e signaling whenever a new data is produced in a buffer of the UE and an amount of the new data to be transmitted by the UE exceeds the threshold value after reporting the start of the packet data service.

8. The method as claimed in claim 7, wherein the BO is a total amount of data in the buffer of the UE, or data newly produced after a report of the previous buffer state information.

9. A method of efficiently providing transmission power status information (TPS) and buffer occupancy information (BO) of a user equipment (UE), in a mobile communication system, the method comprising the steps of:

confirming whether an amount of data to be transmitted by the UE exceeds a preset threshold value;

if the amount of data exceeds the threshold value, including the TPS and the BO of the UE in a protocol data unit (PDU) of a media access control layer (MAC-e);

reporting a start of a packet data service by transmitting the MAC-e PDU that comprises the TPS and the BO of the UE to a Node B through a MAC-e signaling; and transmitting indication information that indicates an end of the TPS transmission of the UE to the UE through a dedicated physical control channel if the amount of data to be transmitted by the UE is less than the threshold value.

10. The method as claimed in claim 9, further comprising the step of reporting a continuation of the packet data service by periodically transmitting the TPS of the UE through a dedicated physical control channel after reporting the start of the packet data service.

11. The method as claimed in claim 9, further comprising the step of reporting a continuation of the packet data service by transmitting the BO of the UE to the Node B through a MAC-e signaling whenever a new data is produced in a buffer of the UE and an amount of the new data to be transmitted by the UE exceeds the threshold value after reporting the start of the packet data service.

12. The method as claimed in claim 11, wherein the BO is a total amount of data in the buffer of the UE, or data newly produced after reporting a previous BO.

13. A method of efficiently providing transmission power status information (TPS) and buffer occupancy information (BO) of a user equipment (UE), in a mobile communication system, the method comprising the steps of:

reporting a start of a packet data service by including only the BO of the UE in a protocol data unit (PDU) of a media access control layer (MAC-e) and transmitting the MAC-e PDU to a Node B through a MAC-e signaling if an amount of new data to be transmitted by the UE exceeds a preset threshold value;

reporting continuation of the packet data service by periodically transmitting the TPS information of the UE to the Node B through a dedicated physical control channel (DPCCH) after reporting the start of the packet data service; and reporting an indicator that indicates an end of the TPS transmission to the Node B through a MAC-e signaling if the amount of data to be transmitted by the UE is less than the threshold value.

14. The method as claimed in claim 13, further comprising the step of reporting a continuation of the packet data service by transmitting the TPS of the UE to the Node B through a MAC-e signaling whenever new data to be transmitted is produced in a buffer of the UE and the amount of data to be transmitted exceeds the threshold value after reporting the start of the packet data service.

15. The method as claimed in claim 14, wherein the BO is a total amount of data in the buffer of the UE, or data newly produced after reporting a previous BO.

16. A method of efficiently providing transmission power status information (TPS) and buffer occupancy information (BO) of a user equipment (UE), in a mobile communication system, the method comprising the steps of:

reporting a start of a packet data service by including only the BO of the UE in a protocol data unit (PDU) of a media access control layer (MAC-e) and transmitting the MAC-e PDU to a Node B through a MAC-e signaling if an amount of new data to be transmitted by the UE exceeds a preset threshold value;

reporting continuation of the packet data service by periodically transmitting the TPS information of the UE to the Node B through a dedicated physical control channel (DPCCH) after reporting the start of the packet data service; and ending the TPS transmission if the amount of data to be transmitted by the UE is less than the threshold value.

17. The method as claimed in claim 16, further comprising the step of reporting a continuation of the packet data service by transmitting the TPS of the UE to the Node B through a MAC-e signaling whenever new data to be transmitted is produced in a buffer of the UE and the amount of data to be transmitted exceeds the threshold value after reporting the start of the packet data service.

18. The method as claimed in claim 17, wherein the BO is a total amount of data in the buffer of the UE, or data newly produced after reporting a previous BO.

19. A method of efficiently providing transmission power status information (TPS) and buffer occupancy information (BO) of a user equipment (UE), in a mobile communication system, the method comprising the steps of:

reporting a start of a packet data service by including only the BO of the UE in a protocol data unit (PDU) of a media access control layer (MAC-e) and transmitting the MAC-e PDU to a Node B through a MAC-e signaling if an amount of new data to be transmitted by the UE exceeds a preset threshold value;

reporting continuation of the packet data service by periodically transmitting the TPS information of the UE to the Node B through a dedicated physical control channel (DPCCH) after reporting the start of the packet data service; and transmitting indication information that indicates an end of the TPS transmission of the UE to the UE through a dedicated physical control channel if the amount of data to be transmitted by the UE is less than the threshold value.

20. The method as claimed in claim 19, further comprising the step of reporting a continuation of the packet data service by transmitting the TPS of the UE to the Node B through a MAC-e signaling whenever new data to be transmitted is produced in a buffer of the UE and the amount of data to be transmitted exceeds the threshold value after reporting the start of the packet data service.

21. The method as claimed in claim 20, wherein the BO is a total amount of data in the buffer of the UE, or data newly produced after reporting a previous BO.

22. An apparatus for efficiently providing transmission power status information (TPS) and buffer occupancy information (BO) through a user equipment (UE) in a mobile communication system, the apparatus comprising:
   a TPS measurer for measuring the TPS of the UE;
   a data buffer for storing packet data to be transmitted by the UE and generating the BO that is indicated as an amount of the packet data;
   a packet data generator for generating a protocol data unit (PDU) of a media access control layer (MAC-e) that comprises the packet data or input information;
   a packet transmitter for transmitting the generated MAC-e PDU to a Node B through a dedicated physical data channel (DPDCH);
   a dedicated control channel transmitter for transmitting control information input for the MAC-e PDU;
   a BO transmission controller for transmitting the BO of the data buffer to the packet data generator if an amount of data to be transmitted by the UE exceeds a preset threshold value in an initial state in which a packet data service is started or in a continued state in which the packet data service is performed continuously;
   a TPS transmission controller for inputting the TPS of the initial state from the TPS measurer to the packet data generator, wherein the packet data generator generates the MAC-e PDU that comprises the BO and the TPS of the UE in the initial state; and
   wherein the TPS transmission controller generates an indicator that indicates an end of the TPS transmission and inputs the generated indicator to the dedicated control channel transmitter if the amount of data to be transmitted by the UE is less than the threshold value.

23. The apparatus as claimed in claim 22, wherein the TPS transmission controller periodically transmits the TPS through a dedicated control channel in a state that the packet data service continues.

24. The apparatus as claimed in claim 22, wherein the packet data generator generates the packet data that comprises only the BO of the UE.

25. The apparatus as claimed in claim 22, wherein the BO is a total amount of data in the buffer of the UE, or data newly produced after reporting a previous BO.

26. An apparatus for efficiently providing transmission power status information (TPS) and buffer occupancy information (BO) through a user equipment (UE) in a mobile communication system, the apparatus comprising:
   a TPS measurer for measuring the TPS of the UE;
   a data buffer for storing packet data to be transmitted by the UE and generating the BO that is indicated as an amount of the packet data;
   a packet data generator for generating a protocol data unit (PDU) of a media access control layer (MAC-e) that comprises the packet data or input information;
   a packet transmitter for transmitting the generated MAC-e PDU to a Node B through a dedicated physical data channel (DPDCH);
   a dedicated control channel transmitter for transmitting control information input for the MAC-e PDU;
   a BO transmission controller for transmitting the BO of the data buffer to the packet data generator if an amount of data to be transmitted by the UE exceeds a preset threshold value in an initial state or a continued state of a packet data service; and
   a TPS transmission controller for inputting the TPS of the initial state from the TPS measurer to the packet data generator, wherein the packet data generator generates the MAC-e PDU that comprises the BO and the TPS of the UE in the initial state,
   wherein the TPS transmission controller provides instructions to end an operation of the TPS measurer if the amount of data to be transmitted by the UE is less than the threshold value.

27. The apparatus as claimed in claim 26, wherein the TPS transmission controller periodically transmits the TPS through a dedicated control channel in a state that the packet data service continues.

28. The apparatus as claimed in claim 26, wherein the packet data generator generates the packet data that comprises only the BO of the UE.

29. The apparatus as claimed in claim 26, wherein the BO is a total amount of data in the buffer of the UE, or data newly produced after reporting a previous BO.

30. An apparatus for efficiently providing transmission power status information (TPS) and buffer occupancy information (BO) through a user equipment (UE) in a mobile communication system, the apparatus comprising:
   a TPS measurer for measuring the TPS of the UE;
   a data buffer for storing packet data to be transmitted by the UE and generating the BO that is indicated as an amount of the packet data;
   a packet data generator for generating a protocol data unit (PDU) of a media access control layer (MAC-e) that comprises the packet data or input information;
   a packet transmitter for transmitting the generated MAC-e PDU to a Node B through a dedicated physical data channel (DPDCH);
   a dedicated control channel transmitter for transmitting control information input for the MAC-e PDU;
   a BO transmission controller for transmitting the BO of the data buffer to the packet data generator if an amount of data to be transmitted by the UE exceeds a preset threshold value in an initial state or a continued state of a packet data service; and
   a TPS transmission controller for inputting the TPS of the initial state from the TPS measurer to the packet data generator, wherein the packet data generator generates the MAC-e PDU that comprises the BO and the TPS of the UE in the initial state,
   wherein the TPS transmission controller ends an operation of the TPS measurer if an instruction to end the transmission of the UE is received from the Node B.

31. The apparatus as claimed in claim 30, wherein the BO is a total amount of data in the buffer of the UE, or data newly produced after reporting a previous BO.

32. The apparatus as claimed in claim 30, wherein the TPS transmission controller periodically transmits the TPS through a dedicated control channel in a state that the packet data service continues.

33. The apparatus as claimed in claim 30, wherein the packet data generator generates the packet data that comprises only the BO of the UE.

34. An apparatus for efficiently providing transmission power status information (TPS) and buffer occupancy information (BO) through a user equipment (UE) in a mobile communication system, the apparatus comprising:

a TPS measurer for measuring the TPS of the UE;

a data buffer for storing packet data to be transmitted by the UE and generating the BO that is indicated as an amount of the packet data;

a packet data generator for generating a protocol data unit (PDU) of a media access control layer (MAC-e) by the packet data or input information;

a packet transmitter for transmitting the generated MAC-e PDU to a Node B through a dedicated physical data channel (DPDCH);

a dedicated control channel transmitter for transmitting control information input for the MAC-e PDU;

a BO transmission controller for operating to transmit the BO of the data buffer to the packet data generator if an amount of data to be transmitted by the UE exceeds a preset threshold value in an initial state of a packet data service or a continued state of the packet data service; and a TPS transmission controller for periodically transmitting the TPS measured by the TPS measurer to the dedicated control channel transmitter, wherein the TPS transmission controller generates an indicator that indicates an end of the TPS transmission and inputs the generated indicator to the dedicated control channel transmitter if the amount of data to be transmitted by the UE is less than the threshold value.

35. The apparatus as claimed in claim 34, wherein the buffer state information is a total amount of data in the buffer of the UE, or data newly produced after a report of the previous buffer state information.

36. An apparatus for efficiently providing transmission power status information (TPS) and buffer occupancy information (BO) through a user equipment (UE) in a mobile communication system, the apparatus comprising:

a TPS measurer for measuring the TPS of the UE;

a data buffer for storing packet data to be transmitted by the UE and generating the BO that is indicated as an amount of the packet data;

a packet data generator for generating a protocol data unit (PDU) of a media access control layer (MAC-e) by the packet data or input information;

a packet transmitter for transmitting the generated MAC-e PDU to a Node B through a dedicated physical data channel (DPDCH);

a dedicated control channel transmitter for transmitting control information input for the MAC-e PDU;

a BO transmission controller for operating to transmit the BO of the data buffer to the packet data generator if an amount of data to be transmitted by the UE exceeds a preset threshold value in an initial state of a packet data service or a continued state of the packet data service; and a TPS transmission controller for periodically transmitting the TPS measured by the TPS measurer to the dedicated control channel transmitter, wherein the TPS transmission controller provides instructions to end an operation of the TPS measurer if the amount of data to be transmitted by the UE is less than the threshold value.

37. The apparatus as claimed in claim 36, wherein the buffer state information is a total amount of data in the buffer of the UE, or data newly produced after a report of the previous buffer state information.

38. An apparatus for efficiently providing transmission power status information (TPS) and buffer occupancy information (BO) through a user equipment (UE) in a mobile communication system, the apparatus comprising:

a TPS measurer for measuring the TPS of the UE;

a data buffer for storing packet data to be transmitted by the UE and generating the BO that is indicated as an amount of the packet data;

a packet data generator for generating a protocol data unit (PDU) of a media access control layer (MAC-e) by the packet data or input information;

a packet transmitter for transmitting the generated MAC-e PDU to a Node B through a dedicated physical data channel (DPDCH);

a dedicated control channel transmitter for transmitting control information input for the MAC-e PDU;

a BO transmission controller for operating to transmit the BO of the data buffer to the packet data generator if an amount of data to be transmitted by the UE exceeds a preset threshold value in an initial state of a packet data service or a continued state of the packet data service; and a TPS transmission controller for periodically transmitting the TPS measured by the TPS measurer to the dedicated control channel transmitter, wherein the TPS transmission controller ends an operation of the TPS measurer if an instruction to end the transmission of the UE is received from the Node B.

39. The apparatus as claimed in claim 38, wherein the buffer state information is a total amount of data in the buffer of the UE, or data newly produced after a report of the previous buffer state information.

40. An apparatus for efficiently providing transmission power status information (TPS) and buffer occupancy information (BO) through a user equipment (UE) in a mobile communication system, the apparatus comprising:

a dedicated physical data channel (DPDCH) receiver for receiving a protocol data unit (PDU) of a media access control layer (MAC-e) from the UE;

a dedicated physical control channel receiver for receiving control information from the UE;

a TPS report end indicator detector for detecting an indicator that indicates an end of TPS transmission of the UE from the received control information or the MAC-e PDU;

a TPS detector for detecting the TPS of the UE from the received MAC-e PDU;

a BO detector for detecting the BO of the UE from the received MAC-e PDU;

a buffer state estimator for estimating an amount of data in a buffer of the UE by the detected BO and an amount of packet data received from the UE;

a TPS reception controller for detecting the TPS of the UE from the received MAC-e PDU in an initial state of a packet data service and operating to detect the TPS periodically received from the control information during the packet data service; and a TPS report end signal generator for generating a TPS transmission end indicator that indicates an end of the TPS transmission of the UE if the amount of data of the UE detected by the buffer state estimator is less than a preset threshold value.

41. The apparatus as claimed in claim 40, wherein the buffer state information is a total amount of data in the buffer of the UE, or data newly produced after a report of the previous buffer state information.

42. The apparatus as claimed in claim 40, wherein the TPS reception controller controls the TPS report end signal generator to transmit the generated TPS transmission end indicator to the UE.

* * * * *